(12) United States Patent
Wang et al.

(10) Patent No.: US 12,561,504 B2
(45) Date of Patent: Feb. 24, 2026

(54) SPUF BASED ON COMBINATIONAL LOGIC AND SCAN CHAIN

(71) Applicant: Wenzhou University, Zhejiang (CN)

(72) Inventors: Pengjun Wang, Zhejiang (CN); Jia Chen, Zhejiang (CN); Yue Jun Zhang, Zhejiang (CN); Gang Li, Zhejiang (CN); Youyi Zhuang, Zhejiang (CN)

(73) Assignee: Wenzhou University, Zhejiang (CN)

( * ) Notice: Subject to any disclaimer, the term of this patent is extended or adjusted under 35 U.S.C. 154(b) by 628 days.

(21) Appl. No.: 18/087,829

(22) Filed: Dec. 23, 2022

(65) Prior Publication Data

US 2023/0315960 A1 Oct. 5, 2023

(30) Foreign Application Priority Data

Mar. 30, 2022 (CN) .......................... 202210324543.3

(51) Int. Cl.
*G06F 30/333* (2020.01)
*G06F 21/75* (2013.01)

(52) U.S. Cl.
CPC ............ *G06F 30/333* (2020.01); *G06F 21/75* (2013.01)

(58) Field of Classification Search
CPC .......... B60L 53/63; B60L 53/62; B60L 53/16; H02J 7/0031
USPC .......................................... 320/109; 716/136
See application file for complete search history.

(56) References Cited

U.S. PATENT DOCUMENTS

| | | | | |
|---|---|---|---|---|
| 10,211,993 B2 * | 2/2019 | Deyati | .................. | H04L 9/3278 |
| 11,146,252 B2 * | 10/2021 | Schat | ................. | G01R 31/2856 |
| 2014/0103344 A1 * | 4/2014 | Tehranipoor | ..... | G01R 31/31725 |
| | | | | 257/48 |
| 2017/0126415 A1 * | 5/2017 | Deyati | .................. | H04L 9/3278 |
| 2019/0305972 A1 * | 10/2019 | Yao | ........................ | H04L 9/3278 |

(Continued)

FOREIGN PATENT DOCUMENTS

| | | | | |
|---|---|---|---|---|
| CN | 113297634 A * | 8/2021 | ............. | G06F 21/71 |
| CN | 113297634 B * | 6/2022 | ............. | G06F 21/71 |

(Continued)

OTHER PUBLICATIONS

Zhangqing He et al., "A Highly Reliable Arbiter PUF With Improved Uniqueness in FPGA Implementation Using Bit-Self-Test", IEEE Access, vol. 8, Oct. 14, 2020, pp. 181751-181762.

(Continued)

*Primary Examiner* — Suresh Memula

(74) *Attorney, Agent, or Firm* — JCIPRNET

(57) ABSTRACT

An SPUF based on combinational logic and scan chain comprises an external stimulus source, a combinational logic circuit module, a scan chain circuit module, a data processing module and n switch circuits SW0, SW1, . . . , SWn−1, n=2m, and m is an integer greater than or equal to 1; combinational logic circuit module comprises n switch circuits S0, S1, . . . , Sn−1 and a combinational logic circuit; the scan chain circuit module comprises n scan flip-flops (SFFs) SFF0, SFF1, . . . , SFFn−1; each of the n switch circuits SW0, SW1, . . . , SWn−1 and the n switch circuits S0, S1, . . . , Sn−1 is implemented by a 2-to-1 multiplexer. The SPUF based on combinational logic and scan chain has high uniqueness and randomness, requires a few clock frequency changes, and has high reliability, more bits of responses and high security.

1 Claim, 5 Drawing Sheets

(56) References Cited

U.S. PATENT DOCUMENTS

| | | | | | |
|---|---|---|---|---|---|
| 2021/0148977 | A1* | 5/2021 | Bhunia | .......... | G01R 31/318328 |
| 2022/0077858 | A1* | 3/2022 | Bhunia | ........... | H03K 19/17728 |
| 2023/0315960 | A1* | 10/2023 | Wang | .................... | G06F 30/333 |
| | | | | | 716/136 |

FOREIGN PATENT DOCUMENTS

| | | | | | | |
|---|---|---|---|---|---|---|
| CN | 114969845 | A | * | 8/2022 | ............. | G06F 21/71 |
| CN | 112272084 | B | * | 4/2023 | | |
| CN | 110324141 | B | * | 8/2024 | ........... | H04L 9/0861 |
| CN | 119814318 | A | * | 4/2025 | | |
| CN | 120017287 | A | * | 5/2025 | | |
| WO | WO-2011156741 | A1 | * | 12/2011 | ........... | G06F 30/327 |
| WO | WO-2015031683 | A1 | * | 3/2015 | ........... | H03K 19/215 |

OTHER PUBLICATIONS

Yu Zheng et al., "DScanPUF: A Delay-Based Physical Unclonable Function Built Into Scan Chain", IEEE Transactions on Very Large Scale Integration (VLSI) Systems, vol. 24, No. 3, Mar. 2016, pp. 1059-1070.

Sying-Jyan Wang et al., "Register PUF with No Power-Up Restrictions", 2018 IEEE International Symposium on Circuits and Systems (ISCAS), May 27-30, 2018, pp. 1-5.

Abhranil Maiti et al., "A Novel Microprocessor-Intrinsic Physical Unclonable Function", 22nd International Conference on Field Programmable Logic and Applications (FPL), Aug. 29-31, 2012, pp. 380-387.

Aydin Aysu, "Hardware/software co-design of physical unclonable function based authentications on FPGAs", Microprocessors and Microsystems, vol. 39, Issue 7, Oct. 2015, pp. 589-597.

* cited by examiner

SPUF BASED ON COMBINATIONAL LOGIC AND SCAN CHAIN

CROSS-REFERENCE TO RELATED APPLICATION

This application claims the priority benefit of China application serial no. 202210324543.3, filed on Mar. 30, 2022. The entirety of the above-mentioned patent application is hereby incorporated by reference herein and made a part of this specification.

BACKGROUND

Technical Field

The invention relates to an SPUF, in particular to an SPUF based on combinational logic and scan chain.

Description of Related Art

In recent years, hardware security has become an important indicator for integrated circuit (IC) design. Chip designers have to take hardware security into account during circuit design to against malicious attacks such as layout reverse engineering, model attacks and side channel attacks. The physical unclonable function (PUF), as a security primitive, has been widely applied to occasions such as equipment anti-counterfeiting, user authentication and IC intellectual property (IP) core protection. The PUF converts inherent random deviations of device parameters into circuit-level parameter deviations during chip fabrication to generate random digital features. For example, the arbiter PUF (APUF) obtains the circuit delay deviation by using the change of threshold voltage of devices during the fabrication process, and then the delay deviation is arbitrated to generate a highly secure digital key finally.

Traditional PUF circuits generate desired PUF responses depending on a special hardware structure, and are generally classified as hardware PUFs (HPUFs), such as the APUF, the ring oscillator PUF (ROPUF) and the current mirror PUF. Although the performance of these PUFs has been optimized with the continuous improvement by researchers, they still occupy a large area of silicon wafers. The design of low-cost PUFs is becoming more and more attractive for expenditure-sensitive IoT devices. The memory is widely used in electronic devices, and the static random access memory (SRAM) PUF is easy to implement and does not consume extra hardware resources. The SRAM PUF generates responses by extracting the random power-on state in an SRAM unit, so the extraction of its random features depends on repeated power-on, and the PUF responses have to be stored on occasions where frequent power-off is not allowed, which reduces reduce the security. The register PUF generates PUF data by using the uncertainty of sample data of flip-flops in the case of time sequence violation, thus solving the problem of response acquisition of the memory PUF; however, multiplexers need to be added to the original scan chain, leading to extra costs.

MPU PUF is a PUF not using independent hardware as a physical random source, and is classified as the software PUF (SPUF). The MPU PUF generates PUF responses for security certification of FPGAs, in terms of a specific coding rule designed based on errors of an instruction repeated executed by different chips under over-clock according to an established time constraint. During the design process of the MPU PUF, the circuit structure of the MPU is used as a hardware platform, and the whole PUF mechanism is realized by loading software in the MPU, thus solving the problem of dedicated hardware expenditure of the APUF, the RO PUF and the MScanPUF; and the MPU PUF can extract responses easily, thus solving the problem of repeated power-on required by the SRAM PUF. However, when acquiring responses, the MPU PUF has to execute the same instruction repeatedly at different clock frequencies, and a certain coding rule has to be designed to obtain corresponding PUF responses in case of a failure to execute the instruction by the PMU. When the clock frequency is changed, a possible small frequency fluctuation generated in the test process may make the same instruction be executed at different clock frequencies, thus reducing the reliability. In addition, when the MPU PUF is implemented, a target number of sample points need to be selected within a frequency range, and the instruction has to be executed repeatedly at each sample frequency. According to the coding rule, each sample point can generate only two bits of responses, so the MPU PUF can be easily cracked due to the few bits of responses, which is not beneficial to chip authentication. In addition, test results shown that the uniqueness and randomness of the MPU PUF are low.

SUMMARY

The technical issue to be settled by the invention is to provide an SPUF based on combinational logic and scan chain, which has high uniqueness and randomness, requires a few clock frequency changes, and has high reliability, more bits of responses and high security.

The technical solution adopted by the invention to settle the above technical issue is as follows: an SPUF based on combinational logic and scan chain comprises an external stimulus source, a combinational logic circuit module, a scan chain circuit module, a data processing module and n switch circuits $SW_0$, $SW_1$, ..., $SW_{n-1}$, $n=2^m$, and m is an integer greater than or equal to 1; the external stimulus source has n first data output terminals, n stimulus output terminals, n second data output terminals, n selective control output terminals, a first control terminal, a second control terminal and a clock output terminal; the combinational logic circuit module has n first data input terminals $IN\_G_0$, $IN\_G_1$, ..., $IN\_G_{n-1}$, n second data input terminals $IN_0$, $IN_1$, ..., $IN_{n-1}$, n control input terminals $CTL_0$, $CTL_1$, ..., $CTL_{n-1}$, n data output terminals $OUT_0$, $OUT_1$, ..., $OUT_{n-1}$, and n combinational logic paths, and a maximum path delay of the n combinational logic paths is denoted as $T_{path}$; the scan chain circuit module has a scan data input terminal SI_IN, a test control input terminal SE_IN, a clock input terminal CLK, n data input terminals $D_0$, $D_1$, ..., $D_{n-1}$, n data output terminals $Q_0$, $Q_1$, ..., $Q_{n-1}$, and a deviation data output terminal OUT; the n switch circuits $SW_0$, $SW_1$, ..., $SW_{n-1}$ each have a first data input terminal, a second data input terminal, a control input terminal and a data output terminal; the data processing module has a data input terminal and a response output terminal; the n first data output terminals of the external stimulus source are connected to the n first data input terminals $IN\_G_0$, $IN\_G_1$, ..., $IN\_G_{n-1}$ of the combinational logic circuit module in a one-to-one correspondence manner, the n stimulus output terminals of the external stimulus source are connected to the n control input terminals $CTL_0$, $CTL_1$, ..., $CTL_{n-1}$ of the combinational logic circuit module in a one-to-one correspondence manner, the first control terminal of the external stimulus source is connected to the scan data input terminal SI_IN of the scan chain circuit module, the second control terminal of the external stimulus source is connected to the test control input terminal SE_IN of the scan chain circuit module, the clock output terminal of the external stimulus source is connected to the clock input terminal CLK of the scan chain circuit module, the n second data output terminals of the external stimulus source are connected to the first data input terminals of the n switch circuits $SW_0$, $SW_1$, . . . , $SW_{n-1}$ in a one-to-one correspondence manner, the n selective control output terminals of the external stimulus source are connected to the control input terminals of the n switch circuits $SW_0$, $SW_1$, . . . , $SW_{n-1}$ in a one-to-one correspondence manner, the $n^{th}$ data output terminal $OUT_{n-1}$ of the combinational logic circuit module is connected to the second data input terminal of the first switch circuit $SW_0$, the first to the $(n-1)^{th}$ data output terminals $OUT_0$, . . . , $OUT_{n-2}$ of the combinational logic circuit module are connected to the second data input terminals of the switch circuits $SW_1$, . . . , $SW_{n-1}$ in a one-to-one correspondence manner, the data output terminals of the n switch circuits $SW_0$, $SW_1$, . . . , $SW_{n-1}$ are connected to the n data input terminals $D_0$, $D_1$, . . . , $D_{n-1}$ of the scan chain circuit module in a one-to-one correspondence manner, the n data output terminals $Q_0$, $Q_1$, . . . , $Q_{n-1}$ of the scan chain circuit module are connected to the second data input terminals $IN_0$, $IN_1$, . . . , $IN_{n-1}$ of the combinational logic circuit module in a one-to-one correspondence manner, the deviation data output terminal OUT of the scan chain circuit module is connected to the data input terminal of the data processing module, and the response output terminal of the data processing module is used for outputting PUF response data;

The n first data output terminals of the external stimulus source are used for outputting n n-bit path stimulus signals $SIG\_IN_0$, $SIG\_IN_1$, . . . , $SIG\_IN_{n-1}$, the $k^{th}$ n-bit path stimulus signal $SIG\_IN_k$ is used for activating the $k^{th}$ combinational logic path in the combinational logic circuit module, and k=1, 2, . . . , n; the n stimulus output terminals of the external stimulus source are used for outputting n n-bit combinational logic circuit input control signal $CTL\_G_0$, $CTL\_G_1$, . . . $CTL\_G_{n-1}$; the n selective control output terminals of the external stimulus source are used for outputting selective control signals $CTL\_IN_0$, $CTL\_IN_1$, . . . , $CTL\_IN_{n-1}$; the n switch circuits $SW_0$, $SW_1$, . . . , $SW_{n-1}$ turn on their first data input terminals or second data input terminals according to selective control signals input to their control input terminals; data output by the data output terminal of the $j^{th}$ switch circuit $SW_j$ is input to the $j^{th}$ data input terminal $D_j$ of the scan chain circuit module, and is used for controlling the $j^{th}$ data output terminal $Q_j$ of the scan chain circuit module to produce a signal jump, so as to generate and output a scan flip-flop stimulus signal $SIG\_D_j$; the clock output terminal of the external stimulus source is used for outputting five clock signals to the clock input terminal CLK of the scan chain circuit module, and the five clock signals are an initialization clock signal CLK_SU comprising n clock cycles with a length T, a reference clock signal CLK_NC comprising 2n clock cycles with the length T, an over-clock signal CLK_OC comprising 2n clock cycles with a length ranging from 70% T to T, an output clock signal CLK_OUT comprising n(n+1)/2 clock cycles with the length T, and a deviation output clock signal CLK_OUT' comprising n(n+1)/2 clock cycles with the length T, wherein $T=T_{path}$; the first control terminal of the external stimulus source is used for outputting a first control signal, which is used for controlling initialization of the n data output terminals $Q_0$, $Q_1$, . . . , $Q_{n-1}$ of the scan chain circuit module; the second control terminal of the external stimulus source is used for outputting a second control signal, which is a high level signal or a lower level signal and is used for controlling the n data output terminals $Q_0$, $Q_1$, . . . , $Q_{n-1}$ of the scan chain circuit module to output a high level signal or a low level signal; when the second control signal is a high level signal, the n data output terminals $Q_0$, $Q_1$, . . . , $Q_{n-1}$ of the scan chain circuit module output a high level signal; when the second control signal is a low level signal, the n data output terminals $Q_0$, $Q_1$, . . . , $Q_{n-1}$ of the scan chain circuit module output a low level signal;

The combinational logic circuit module comprises n switch circuits $S_0$, $S_1$, . . . , $S_{n-1}$ and a combinational logic circuit, wherein the n switch circuits $S_0$, $S_1$, . . . , $S_{n-1}$ each have a first data input terminal, a second data input terminal, a control input terminal and a data output terminal, the combinational logic circuit has n combinational logic paths with the maximum path delay $T_{path}$, each combinational logic path has an input terminal and an output terminal, the input terminals of the n combinational logic paths are correspondingly n input terminals $INC_0$, $INC_1$, . . . , $INC_{n-1}$ of the combinational logic circuit, the output terminals of the n combinational logic paths are correspondingly n output terminals $OUTC_0$, $OUTC_1$, . . . , $OUTC_{n-1}$ of the combinational logic circuit, the input terminal of the $j^{th}$ combinational logic path is the $j^{th}$ input terminal $INC_j$ of the combinational logic circuit, the output terminal of the $j^{th}$ combinational logic path is the $j^{th}$ output terminal $OUTC_j$ of the combinational logic circuit, the n output terminals $OUTC_0$, $OUTC_1$, . . . , $OUTC_{n-1}$ of the combinational logic circuit are taken as the n data output terminals $OUT_0$, $OUT_1$, . . . , $OUT_{n-1}$ of the combinational logic circuit module, the data output terminals the n switch circuits $S_0$, $S_1$, . . . , $S_{n-1}$ are connected to the n input terminals $INC_0$, $INC_1$, . . . , $INC_{n-1}$ of the combinational logic circuit in a one-to-one correspondence manner, the first data input terminals of the n switch circuits $S_0$, $S_1$, . . . , $S_{n-1}$ are taken as the n second data input terminals $IN_0$, $IN_1$, . . . , $IN_{n-1}$ of the combinational logic circuit module, the second data input terminals of the n switch circuits $S_0$, $S_1$, . . . , $S_{n-1}$ are taken as the n first data input terminals $IN\_G_0$, $IN\_G_1$, . . . , $IN\_G_{n-1}$ of the combinational logic circuit module, and the control input terminals of the n switch circuits $S_0$, $S_1$, . . . , $S_{n-1}$ are taken as the n control input terminals $CTL_0$, $CTL_1$, . . . , $CTL_{n-1}$ of the combinational logic circuit module;

The scan chain circuit module comprises n scan flip-flops (SFFs) $SFF_0$, $SFF_1$, . . . , $SFF_{n-1}$, wherein each scan flip-flop has a data input terminal D, a scan data input terminal SI, a test control input terminal SE, a clock input terminal CK and a data output terminal Q; the data input terminals D of the n scan flip-flops are taken as the n data input terminals $D_0$, $D_1$, . . . , $D_{n-1}$ of the scan chain circuit module; the data output terminal Q of the $f^{th}$ scan flip-flop is connected to the scan data input terminal SI of the $(f+1)^{th}$ scan flip-flop, a connecting terminal is taken as the $f^{th}$ data output terminal $Q_{f-1}$ of the scan chain circuit module, and f=i, 2, . . . , n–1; the data output terminal Q of the $n^{th}$ scan flip-flop is taken as the $n^{th}$ data output terminal $Q_{n-1}$ and the deviation data output terminal OUT of the scan chain circuit module; the clock input terminals CK of the n scan flip-flops are connected, and a connecting terminal is the clock input terminal CLK of the scan chain circuit module; the test control input terminals SE of the n scan flip-flops are connected, and a connecting terminal is taken as the test control input terminal SE_IN of the scan chain circuit module; the scan data input terminal SI of the first scan flip-flop is the scan data input terminal of the scan chain circuit module; each of the n switch circuits $SW_0$, $SW_1$, . . . , $SW_{n-1}$ and the n switch circuits $S_0$, $S_1$, . . . , $S_{n-1}$ is implemented by a 2-to-1 multiplexer, which has a first data input terminal A, a second data input terminal B, a control input terminal and a data output terminal, wherein the first data input terminal A of the 2-to-1 multiplexer is taken as the first data input terminal of the switch circuit, the second data input terminal B of the 2-to-1 multiplexer is taken as the second data input terminal of the switch circuit, the control input terminal of the 2-to-1 multiplexer is taken as the control input terminal of the switch circuit, and the data output terminal of the 2-to-1 multiplexer is taken as the data output terminal of the switch circuit;

The specific process of generating PUF responses of the SPUF based on combinational logic and scan chain comprises the following steps:

Step 1: generating reference data, which specifically comprises:

S1-1: acquiring a first sample result signal: first, outputting, by the second control terminal of the external stimulus source, a high level signal to the test control input terminal SE_IN of the scan chain circuit module, outputting, by the clock output terminal of the external stimulus source, the initialization clock signal CLK_SU comprising the n clock cycles with the length T to the clock input terminal CLK of the scan chain circuit module, and inputting in series, by the first control terminal of the external stimulus source, a first control signal for initializing the n data output terminals $Q_0$, $Q_1$, . . . , $Q_{n-1}$ of the scan chain circuit module to the scan data input terminal SI_IN of the scan chain circuit module within each cycle of the initialization clock signal CLK_SU, such that the n data output terminals $Q_0$, $Q_1$, . . . , $Q_{n-1}$ of the scan chain circuit module are initialized after the n cycles of the initialization clock signal CLK_SU; then, outputting, by the second control terminal of the external stimulus source, a low level signal to the test control input terminal SE_IN of the scan chain circuit module, outputting, by the clock signal output terminal of the external stimulus source, the reference clock signal CLK_NC comprising the 2n clock cycles with the length T to the clock input terminal CLK of the scan chain circuit module, outputting, by the n selective control output terminals of the external stimulus source, a selective control signal $CTL\_IN_0$ to the control input terminals of the switch circuits $SW_0$, $SW_1$, $SW_2$, . . . , $SW_{n-1}$ to enable the switch circuit $SW_0$ to turn on its first data input terminal and enable the other (n–1) switch circuits $SW_1$, $SW_2$, . . . , $SW_{n-1}$ to turn on their second data input terminals, inputting, by the $1^{st}$ second data output terminal of the external stimulus source, a first scan flip-flop stimulus signal $SIG\_D_0$ to the first data input terminal of the switch circuit $SW_0$, and producing, by the data output terminal Q of the first scan flip-flop $SFF_0$, a signal jump within the first clock cycle of the reference clock signal CLK_NC to output a first combinational circuit stimulus signal $J_0$; next, inputting, by the n first data output terminals of the external stimulus source, a first n-bit path stimulus signal $SIG\_IN_0$ to the n first data input terminals $IN\_G_0$, $IN\_G_1$, . . . , $IN\_G_{n-1}$ of the combinational logic circuit module, inputting, by the n stimulus output terminals of the external stimulus source, a first n-bit combinational logic circuit input control signal $CTL\_G_0$ to the n control input terminals $CTL_0$, $CTL_1$, . . . , $CTL_{n-1}$ of the combinatorial logic circuit module to enable the switch circuit $S_0$ to turn on its first data input terminal and enable the other (n–1) switch circuits $S_1$, $S_2$, . . . , $S_{n-1}$ to turn on their second data input terminals, transmitting, by the $1^{st}$ second data input terminal $IN_0$ of the combinational logic circuit module, the first combinational circuit stimulus signal $J_0$ to the first input terminal $INC_0$ of the combinational logic circuit, correspondingly transmitting other bits than the first one of the first n-bit path stimulus signal $SIG\_IN_0$ to the input terminals $INC_1$, $INC_2$, . . . , $INC_{n-1}$ of the combination logic circuit to activate the first combinational logic path of the combinational logic circuit, producing, by the first combinational logic path, a signal jump at the output terminal $OUTC_0$ of the combinational logic circuit, at this moment, outputting, by the output terminal $OUTC_0$ of the combinational logic circuit module, a first sampled signal $P_0$, and outputting, by the data output terminal Q of the second scan flip-flop $SFF_1$, a first sample result signal $R_0$ within the second clock cycle of the reference clock signal CLK_NC; and finally, outputting, by the second control terminal of the external stimulus source, a high level signal to the test control input terminal SE_IN of the scan chain circuit module, outputting, by the clock output terminal of the external stimulus source, the output clock signal CLK_OUT comprising the n(n+1)/2 clock cycles with the length T to the clock input terminal CLK of the scan chain circuit module, and after the first (n–1) clock cycles, outputting, by the deviation data output terminal OUT of the scan chain circuit module, the first sample result signal $R_0$ to the data processing module;

S1-2: acquiring a second sample result signal: first, outputting, by the second control terminal of the external stimulus source, a low level signal to the test control input terminal SE_IN of the scan chain circuit module, inputting, by the clock output terminal of the external stimulus source, the reference clock signal CLK_NC comprising the 2n clock cycles with the length T to the clock input terminal CLK of the scan chain circuit module, and inputting, by the n selective control output terminals of the external stimulus source, a second n-bit external stimulus source input control signal $CTL\_IN_1$ to the n control input terminals of the switch circuits $SW_0$, $SW_1$, . . . , $SW_{n-1}$ to enable the switch circuit $SW_1$ to turn on its first data input terminal and the other (n–1) switch circuits $SW_0$, $SW_2$, $SW_3$, . . . , $SW_{n-1}$ to turn on their second data input terminals, inputting, by the $2^{nd}$ second data output terminal of the external stimulus source, a second scan flip-flop stimulus signal $SIG\_D_1$ to the second data input terminal of the switch circuit $SW_1$, and producing, by the data output terminal Q of the second scan flip-flop $SFF_1$, a signal jump within the third clock cycle of the reference clock signal CLK_NC to output a second combinational circuit stimulus signal $J_1$; then, inputting, by the external stimulus source, a second n-bit path stimulus signal $SIG\_IN_1$ to the n control input terminals $CTL_0$, CTL, . . . , $CTL_{n-1}$ of the combinational logic circuit module, inputting a second n-bit combinational logic circuit input control signal $CTL\_G_1$ to the n control input terminals $CTL_0$, $CTL_1$, . . . , $CTL_{n-1}$ of the combinatorial logic circuit module to enable the switch circuit $S_1$ to turn on its first data input terminal and enable the other (n–1) switch circuits $S_0$, $S_2$, $S_3$, . . . , $S_{n-1}$ to turn on their second data input terminals, transmitting, by the second data input terminal $IN_1$ of the combinational logic circuit module, the second combinational circuit stimulus signal $J_1$ to the input terminal $INC_1$ of the combinational logic circuit, correspondingly transmitting other bits than the first one of the second n-bit path stimulus signal $SIG\_IN_1$ to $INC_0$, $INC_2$, $INC_3$, . . . , $INC_{n-1}$ of the combination logic circuit to activate the second combinational logic path, producing, by the second combinational logic path, a signal jump at the second output terminal $OUTC_1$ of the combinational logic circuit, outputting, by the second data output terminal $OUT_1$ of the combinational logic circuit module, a second sampled signal $P_1$, and outputting, by the data output terminal Q of the third scan flip-flop $SFF_2$, a second sample result signal $R_1$ within the fourth clock cycle of the reference clock signal CLK_NC; and finally, outputting, by the second control terminal of the external stimulus source, a high level signal to the test control input terminal SE_IN of the scan chain circuit module, inputting, by the clock output terminal of the external stimulus source, the output clock signal CLK_OUT comprising the n(n+1)/2 clock cycles with the length T to the clock input terminal CLK of the scan chain circuit module, and after (n–2) clock cycles from the $n^{th}$ cycle of the clock signal CLK_OUT, outputting, by the deviation data output terminal OUT of the scan chain circuit module, the second sample result signal $R_1$ to the data processing module;

S1-3: acquiring a third sample result signal; first, outputting, by the second control terminal of the external stimulus source, a low level signal to the test control input terminal SE_IN of the scan chain circuit module, inputting, by the clock output terminal of the external stimulus source, the reference clock signal CLK_NC comprising the 2n clock cycles with the length T to the clock input terminal CLK of the scan chain circuit module, and inputting, by the n selective control output terminals of the external stimulus source, a third n-bit external stimulus source input control signal $CTL\_IN_2$ to the n control input terminals of the switch circuits $SW_0$, $SW_1$, . . . , $SW_{n-1}$ to enable the switch circuit $SW_2$ to turn on its first data input terminal and enable the other (n–1) switch circuits $SW_0$, $SW_1$, $SW_3$, $SW_4$, . . . , $SW_{n-1}$ to turn on their second data input terminals, inputting, by the external stimulus source, a third scan flip-flop stimulus signal $SIG\_D_2$ to the first data input terminal of the switch circuit $SW_2$, and producing, by the data output terminal Q of the third scan flip-flop $SFF_2$, a signal jump within the fifth clock cycle of the reference clock signal CLK_NC to output a third combinational circuit stimulus signal $J_2$; then, inputting, by the external stimulus source, a third n-bit path stimulus signal $SIG\_IN_2$ to the n first data input terminals $IN\_G_0$, $IN\_G_1$, . . . , $IN\_G_{n-1}$ of the combinational logic circuit module, inputting a third n-bit combinational logic circuit input control signal $CTL\_G_2$ to the n control input terminals $CTL_0$, $CTL_1$, . . . , $CTL_{n-1}$ of the combinatorial logic circuit module to enable the switch circuit $S_2$ to turn on its first data input terminal and enable the other (n–1) switch circuits $S_0$, $S_1$, $S_3$, $S_4$, . . . , $S_{n-1}$ to turn on their second data input terminals, transmitting, by the second data input terminal $IN_2$ of the combinational logic circuit module, the third combinational circuit stimulus signal $J_2$ to the input terminal $INC_2$ of the combinational logic circuit, correspondingly transmitting other bits than the first one of the third n-bit path stimulus signal $SIG\_IN_2$ to other output terminals $INC_0$, $INC_1$, $INC_3$, $INC_4$, . . . , $INC_{n-1}$ of the combination logic circuit to activate the third combinational logic path, producing, by the third combinational logic path, a signal jump at the output terminal $OUTC_2$ of the combinational logic circuit, outputting, by the data output terminal $OUT_2$ of the combinational logic circuit module, a third sampled signal $P_2$, and outputting, by the data output terminal Q of the fourth scan flip-flop $SFF_3$, a third sample result signal $R_2$ within the sixth clock cycle of the reference clock signal CLK_NC; and finally, outputting, by the second control terminal of the external stimulus source, a high level signal to the test control input terminal SE_IN of the scan chain circuit module, outputting, by the clock output terminal of the external stimulus source, the output clock signal CLK_OUT comprising the n(n+1)/2 clock cycles with the length T to the clock input terminal CLK of the scan chain circuit module, and after (n–3) clock cycles from the $(2n-1)^{th}$ cycle of the output clock signal CLK_OUT, outputting, by the deviation data output terminal OUT of the scan chain circuit module, the third sample result signal $R_2$ to the data processing module;

S1-4: sequentially acquiring a fourth sample result signal to an $n^{th}$ sample result signal $R_3$, $R_4$, . . . , $R_{n-1}$ in the same way as S1-1 to S1-3, and outputting the fourth sample result signal the an $n^{th}$ sample result signal $R_3$, $R_4$, . . . , $R_{n-1}$ to the data processing module;

Step 2: generating deviation data, which specifically comprises:

S2-1: acquiring a first deviation sample result signal: first, outputting, by the second control terminal of the external stimulus source, a high level signal to the test control input terminal SE_IN of the scan chain circuit module, inputting, by the clock output terminal of the external stimulus source, the initialization clock signal CLK_SU comprising the n clock cycles with the length T to the clock input terminal CLK of the scan chain circuit module, outputting, by the first control terminal of the external stimulus source, a first control signal to the scan data input terminal SI_IN of the scan chain circuit module to initialize the n data output terminals of the scan chain circuit module within each cycle of the initialization clock signal CLK_SU, such that after n cycles, the n data output terminals of the scan chain circuit module are initialized; then, outputting, by the second control terminal of the external stimulus source, a low level signal to the test control input terminal SE_IN of the scan chain circuit module, inputting, by the clock output terminal of the external stimulus source, the over-clock signal CLK_OC comprising the 2n clock cycles with the length ranging from 70% T to T to the clock input terminal CLK of the scan chain circuit module, inputting, by the selective control output terminals of the external stimulus source, a first n-bit external stimulus source input control signal $CTL\_IN_0$ to the control input terminals of the switch circuits $SW_0$, $SW_1$, . . . , $SW_{n-1}$ to enable the switch circuit $SW_0$ to turn on its first data input terminal and enable the other (n–1) switch circuits $SW_1$, $SW_2$, . . . , $SW_{n-1}$ to turn on their second data input terminals, inputting, by the $1^{st}$ second data output terminal of the external stimulus source, a first scan flip-flop stimulus signal $SIG\_D_0$ to the first data input terminal of the switch circuit $SW_0$, producing, by the data output terminal Q of the first scan flip-flop $SFF_0$, a signal jump within the first clock cycle of the over-clock signal CLK_OC, and outputting, by the first data output terminal of the scan chain circuit module, a first deviation stimulus signal $J_0'$; then, inputting, by the n first data output terminals of the external stimulus source, a first n-bit path stimulus signal SIG_$IN_0$ to the n data input terminals IN_$G_0$, IN_$G_1$, . . . , IN_$G_{n-1}$ of the combinational logic circuit module, inputting, by the n stimulus output terminals of the external stimulus source, a first n-bit combinational logic circuit input control signal CTL_$G_0$ to the n control input terminals $CTL_0$, $CTL_1$, . . . , $CTL_{n-1}$ of the combinational logic circuit module to enable the switch circuit $S_0$ to turn on its first data input terminal and enable the other (n−1) switch circuits $S_1$, $S_2$, . . . , $S_{n-1}$ to turn on their second data input terminals, transmitting, by the second data input terminal $IN_0$ of the combinational logic circuit module, the first deviation stimulus signal $J_0'$ to the input terminal $INC_0$ of the combinational logic circuit, correspondingly transmitting other bits than the first one of the first n-bit path stimulus signal SIG_$IN_0$ to the output terminals $INC_1$, $INC_2$, . . . , $INC_{n-1}$ of the combinational logic circuit to activate the first combinational logic path, producing, by the first combinational logic path, a signal jump at the output terminal $OUTC_0$ of the combinational logic circuit, outputting, by the output terminal $OUT_0$ of the combinational logic circuit module, a first deviation sample signal $P_0'$, and outputting, by the data output terminal Q of the second scan flip-flop $SFF_1$, a first deviation sample result signal $R_0'$ within the second clock cycle of the over-clock signal CLK_OC; and finally, outputting, by the second control terminal of the external stimulus source, a high level signal to the test control input terminal SE_IN of the scan chain circuit module, inputting, by the clock output terminal of the external stimulus source, the deviation output clock signal CLK_OUT' comprising n(n+1)/2 clock cycles with the length T to the clock input terminal CLK of the scan chain circuit module, and after the first (n−1) clock cycles, outputting, by the deviation data output terminal OUT of the scan chain circuit module, the first deviation sample result signal $R_0'$ to the data processing module;

S2-2: acquiring a second deviation sample result signal: first, outputting, by the second control terminal of the external stimulus source, a low level signal to the test control input terminal SE_IN of the scan chain circuit module, inputting, by the clock output terminal of the external stimulus source, the over-clock signal CLK_OC comprising 2n clock cycles with the length ranging from 70% T to T to the clock input terminal CLK of the scan chain circuit module, inputting, by the selective control output terminals of the external stimulus source, a second n-bit external stimulus source input control signal CTL_$IN_1$ to the control input terminals of the switch circuits $SW_0$, $SW_1$, . . . , $SW_{n-1}$ to enable the switch circuit $SW_1$ to turn on its first data input terminal and enable the other (n−1) switch circuits $SW_0$, $SW_2$, $SW_3$, . . . , $SW_{n-1}$ to turn on their second data input terminals, inputting, by the $2^{nd}$ second data output terminal of the external stimulus source, a second scan flip-flop stimulus signal SIG_$D_1$ to the first data input terminal of the switch circuit $SW_1$, producing, by the data output terminal Q of the second scan flip-flop $SFF_1$, a signal jump within the third clock cycle of the over-clock signal CLK_OC, and outputting, by the second data output terminal of the scan chain circuit module, a second deviation stimulus signal $J_1'$; next, inputting, by the n first data output terminals of the external stimulus source, a second n-bit path stimulus signal SIG_$IN_1$ to the n first data input terminals IN_$G_0$, IN_$G_1$, . . . , IN_$G_{n-1}$ of the combinational logic circuit module, inputting, by the n stimulus output terminals of the external stimulus source, a second n-bit combinational logic circuit input control signal CTL_$G_1$ to the n control input terminals $CTL_0$, $CTL_1$, . . . , $CTL_{n-1}$ of the combinational logic circuit module to enable the switch circuit $S_1$ to turn on its first data input terminal and enable the other (n−1) switch circuits $S_0$, $S_2$, $S_3$, . . . , $S_{n-1}$ to turn on their second data input terminals, transmitting, by the second data input terminal $IN_1$ of the combinational logic circuit module, the second deviation stimulus signal $J_1'$ to the input terminal $INC_1$ of the combinational logic circuit, correspondingly transmitting other bits than the first one of the second n-bit path stimulus signal SIG_$IN_1$ to the output terminals $INC_0$, $INC_2$, $INC_3$, . . . , $INC_{n-1}$ of the combinational logic circuit to activate the second combinational logic path, producing, by the second combinational logic path, a signal jump at the output terminal $OUTC_1$ of the combinational logic circuit, and outputting, by the second output terminal $OUT_1$ of the combinational logic circuit module, a second deviation sample signal $P_1'$, and outputting, by the data output terminal Q of the third scan flip-flop $SFF_2$, a second deviation sample result signal $R_1'$ within the fourth clock cycle of the over-clock signal CLK_OC; and finally, outputting, by the second control terminal of the external stimulus source, a high level signal to the test control input terminal SE_IN of the scan chain circuit module, inputting, by the clock output terminal of the external stimulus source, the deviation output clock signal CLK_OUT' comprising n(n+1)/2 clock cycles with the length T to the clock input terminal CLK of the scan chain circuit module, and after (n−2) clock cycles from the $n^{th}$ cycle of the deviation output clock signal CLK_OUT', outputting, by the deviation data output terminal OUT of the scan chain circuit module, the second deviation sample result signal $R_1'$ to the data processing module;

S2-3: acquiring a third deviation sample result signal: first, outputting, by the second control terminal of the external stimulus source, a low level signal to the test control input terminal SE_IN of the scan chain circuit module, inputting, by the clock output terminal of the external stimulus source, the over-clock signal CLK_OC comprising 2n clock cycles with the length ranging from 70% T to T to the clock input terminal CLK of the scan chain circuit module, inputting, by the n selective control output terminals of the external stimulus source, a third n-bit external stimulus source input control signal CTL_$IN_2$ to the control input terminals of the switch circuits $SW_0$, $SW_1$, . . . , $SW_{n-1}$ to enable the switch circuit $SW_2$ to turn on its first data input terminal and enable the other (n−1) switch circuits $SW_0$, $SW_1$, $SW_3$, $SW_4$, . . . , $SW_{n-1}$ to turn on their second data input terminals, inputting, by the $3^{rd}$ second data output terminal of the external stimulus source, a third scan flip-flop stimulus signal SIG_$D_2$ to the first data input terminal of the switch circuit $SW_2$, producing, by the data output terminal Q of the third scan flip-flop $SFF_2$, a signal jump within the fifth clock cycle of the over-clock signal CLK_OC, and outputting, by the third data output terminal of the scan chain circuit module, a third deviation stimulus signal $J_2'$; next, inputting, by the n first data output terminals of the external stimulus source, a third n-bit path stimulus signal SIG_IN$_2$ to the n first data input terminals IN_G$_0$, IN_G$_1$, ..., IN_G$_{n-1}$ of the combinational logic circuit module, inputting, by the n stimulus output terminals of the external stimulus source, a third n-bit combinational logic circuit input control signal CTL_G$_2$ to the n control input terminals CTL$_0$, CTL$_1$, ..., CTL$_{n-1}$ of the combinational logic circuit module to enable the switch circuit S$_2$ to turn on its first data input terminal and enable the other (n–1) switch circuits S$_0$, S$_1$, S$_3$, S$_4$, ..., S$_{n-1}$ to turn on their second data input terminals, transmitting, by the second data input terminal IN$_2$ of the combinational logic circuit module, the third deviation stimulus signal J$_2$' to the input terminal INC$_2$ of the combinational logic circuit, correspondingly transmitting other bits than the first one of the third n-bit path stimulus signal SIG_IN$_2$ to the output terminals INC$_0$, INC$_2$, INC$_3$, ..., INC$_{n-1}$ of the combinational logic circuit to activate the third combinational logic path, producing, by the third combinational logic path, a signal jump at the output terminal OUTC$_2$ of the combinational logic circuit, and outputting, by the third output terminal OUT$_2$ of the combinational logic circuit module, a third deviation sample signal P$_2$', and outputting, by the data output terminal Q of the fourth scan flip-flop SFF$_3$, a third deviation sample result signal R$_2$' within the sixth clock cycle of the over-clock signal CLK_OC; and finally, outputting, by the second control terminal of the external stimulus source, a high level signal to the test control input terminal SE_IN of the scan chain circuit module, inputting, by the clock output terminal of the external stimulus source, the output clock signal CLK_OUT comprising n(n+1)/2 clock cycles with the length T to the clock input terminal CLK of the scan chain circuit module, and after (n–3) clock cycles from the (2n–1)$^{th}$ cycle of the output clock signal CLK_OUT, outputting, by the deviation data output terminal OUT of the scan chain circuit module, the third deviation sample result signal R$_2$' to the data processing module;

S2-4: sequentially acquiring the fourth deviation sample result signal to the n$^{th}$ deviation sample result signal R$_3$', R$_4$', ..., R$_{n-1}$' in the same way as S2-1 to S2-3, and outputting the fourth deviation sample result signal to the n$^{th}$ deviation sample result signal R$_3$', R$_4$', ..., R$_{n-1}$' to the data processing module; and Step 3: data processing: performing, by the data processing module, a bitwise XOR operation on logic values L$_0$, L$_1$, ..., L$_{n-1}$ of the sample result signals R$_0$, R$_1$, ..., R$_{n-1}$ and logic values L$_0$', L$_1$', ..., L$_{n-1}$' of the deviation sample result signals R$_0$', R$_1$', ..., R$_{n-1}$' to obtain an n-bit binary sequence SEQ, then calculating the number CNT of logic 1 in SEQ, converting CNT into a log$_2$ n-bit binary number which a PUF response, and outputting the PUF response by the response output terminal of the data processing module.

Compared with the prior art, the invention has the following advantages: by means of any one combinational logic circuit and the scan chain commonly existing in an VLSI circuit, the special area expenditure of hardware PUFs is avoided; PUF responses can be generated at any time during operation of the circuit, the power does not need to be cut off, a few clock frequency changes are needed, and more bits of responses can be generated, so the security is improved; by means of the combinational logic circuit module with a large circuit delay, the over-clock requirement is greatly lowered, and the dynamic power consumption is reduced accordingly, so the SPUF can be applied to the field of hardware security; so, the SPUF based on combinational logic and scan chain provided by the invention has high uniqueness and randomness, requires a few clock frequency changes, and has high reliability, more bits of responses and high security.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The invention will be described in further detail below in conjunction with the accompanying drawings and embodiments.

Figure 1:
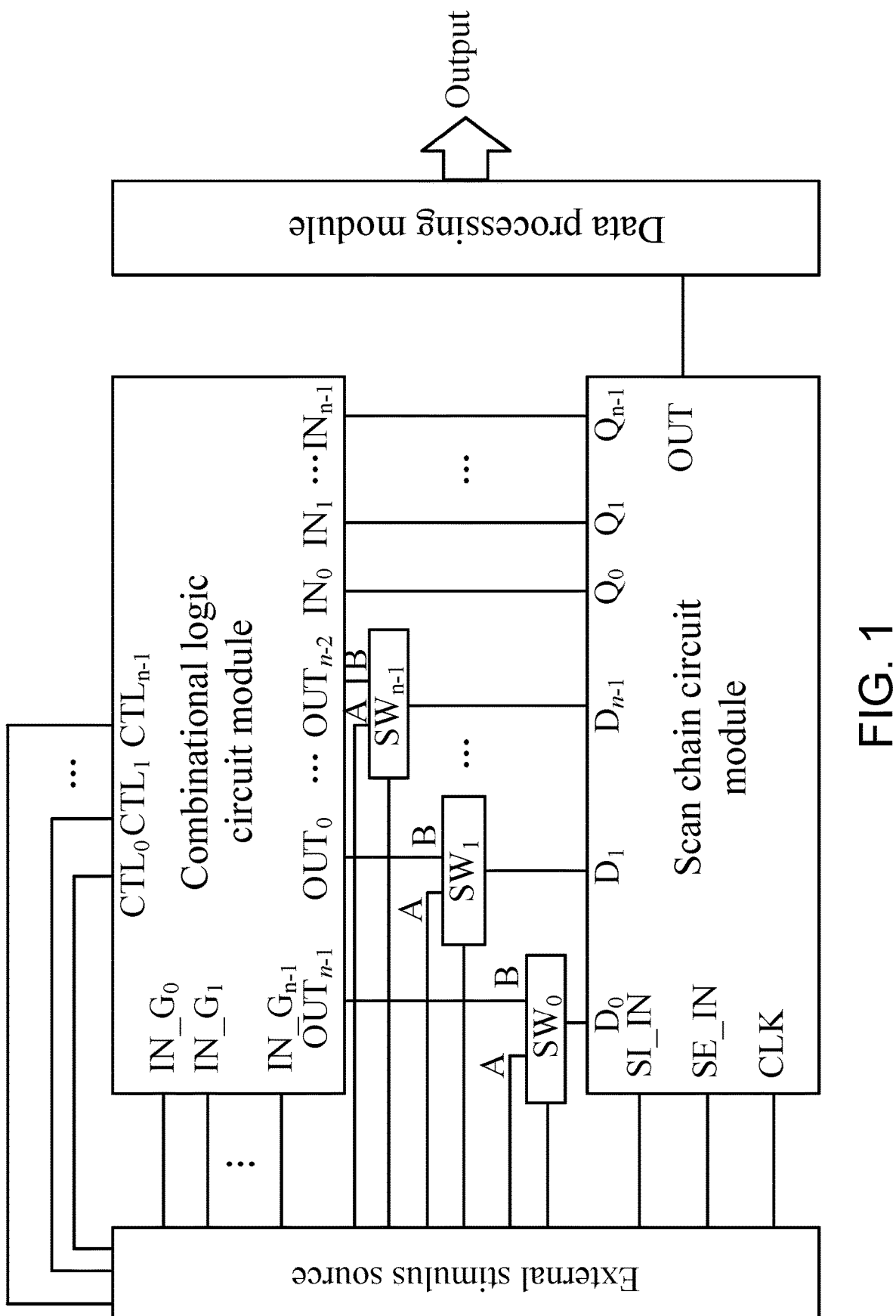
FIG. 1 is a structural diagram of an SPUF based on combinational logic and scan chain according to the invention.
Figure 2:
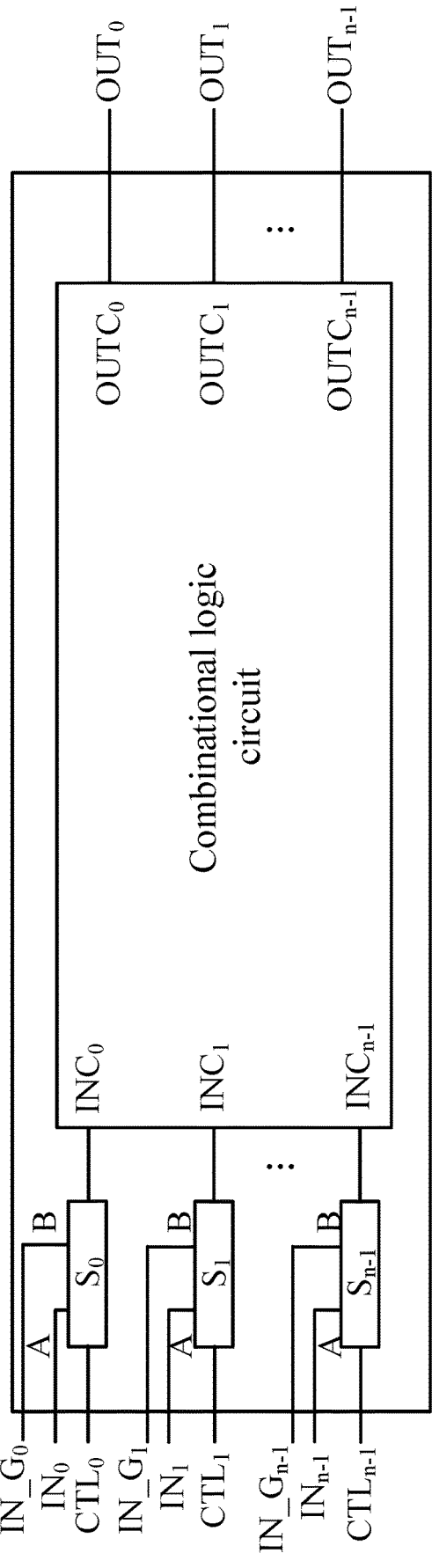
FIG. 2 is a structural diagram of a combinational logic circuit module of the SPUF based on combinational logic and scan chain according to the invention.
Figure 3:
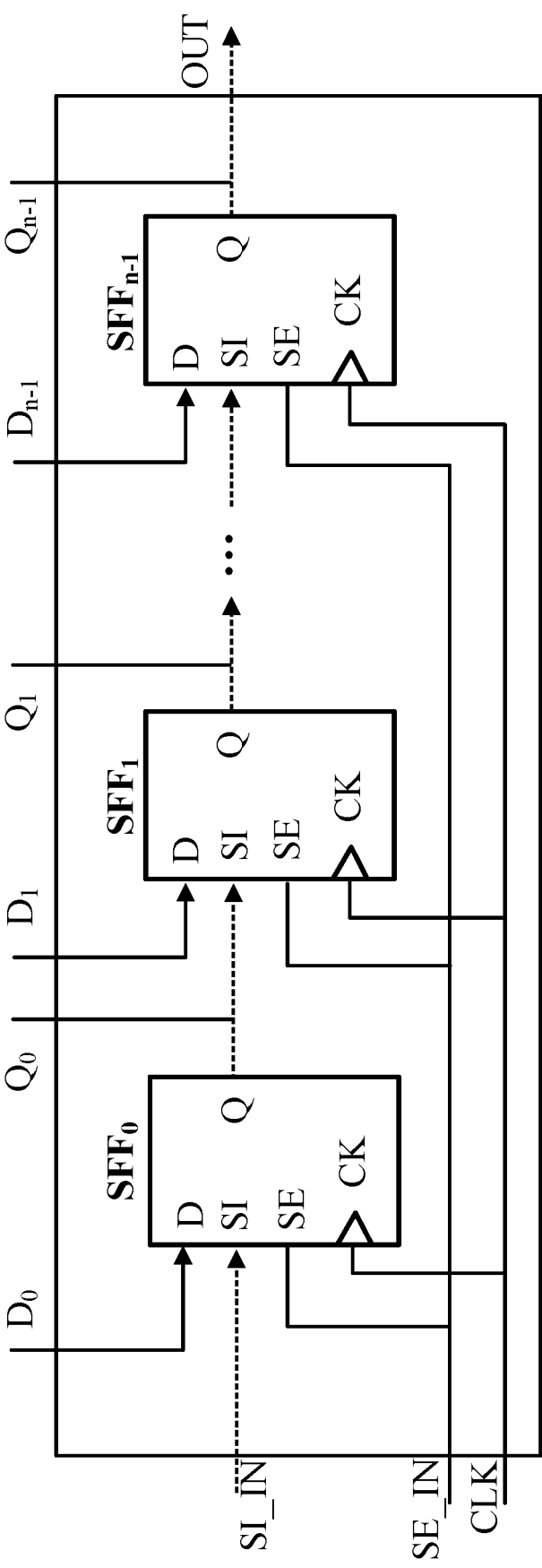
FIG. 3 is a structural diagram of a scan chain circuit module of the SPUF based on combinational logic and scan chain according to the invention.

Embodiment: As Shown in FIG. 1 to FIG. 3, an SPUF Based on Combinational Logic and scan chain comprises an external stimulus source, a combinational logic circuit module, a scan chain circuit module, a data processing module and n switch circuits SW$_0$, SW$_1$, ..., SW$_{n-1}$ n=2$^m$, and m is an integer greater than or equal to 1; the external stimulus source has n first data output terminals, n stimulus output terminals, n second data output terminals, n selective control output terminals, a first control terminal, a second control terminal and a clock output terminal; the combinational logic circuit module has n first data input terminals IN_G$_0$, IN_G$_1$, ..., IN_G$_{n-1}$, n second data input terminals IN$_0$, IN$_1$, ..., IN$_{n-1}$, n control input terminals CTL$_0$, CTL$_1$, ..., CTL$_{n-1}$, n data output terminals OUT$_0$, OUT$_1$, ..., OUT$_{n-1}$, and n combinational logic paths, and a maximum path delay of the n combinational logic paths is denoted as T$_{path}$; the scan chain circuit module has a scan data input terminal SI_IN, a test control input terminal SE_IN, a clock input terminal CLK, n data input terminals D$_0$, D$_1$, ..., D$_{n-1}$, n data output terminals Q$_0$, Q$_1$, ..., Q$_{n-1}$, and a deviation data output terminal OUT; the n switch circuits SW$_0$, SW$_1$, ..., SW$_{n-1}$ each have a first data input terminal, a second data input terminal, a control input terminal and a data output terminal; the data processing module has a data input terminal and a response output terminal; the n first data output terminals of the external stimulus source are connected to the n first data input terminals $IN\_G_0$, $IN\_G_1$, ..., $IN\_G_{n-1}$ of the combinational logic circuit module in a one-to-one correspondence manner, the n stimulus output terminals of the external stimulus source are connected to the n control input terminals $CTL_0$, $CTL_1$, ..., $CTL_{n-1}$ of the combinational logic circuit module in a one-to-one correspondence manner, the first control terminal of the external stimulus source is connected to the scan data input terminal SI_IN of the scan chain circuit module, the second control terminal of the external stimulus source is connected to the test control input terminal SE_IN of the scan chain circuit module, the clock output terminal of the external stimulus source is connected to the clock input terminal CLK of the scan chain circuit module, the n second data output terminals of the external stimulus source are connected to the first data input terminals of the n switch circuits $SW_0$, $SW_1$, ..., $SW_{n-1}$ in a one-to-one correspondence manner, the n selective control output terminals of the external stimulus source are connected to the control input terminals of the n switch circuits $SW_0$, $SW_1$, ..., $SW_{n-1}$ in a one-to-one correspondence manner, the $n^{th}$ data output terminal $OUT_{n-1}$ of the combinational logic circuit module is connected to the second data input terminal of the first switch circuit $SW_0$, the first to the $(n-1)^{th}$ data output terminals $OUT_0$, ..., $OUT_{n-2}$ of the combinational logic circuit module are connected to the second data input terminals of the switch circuits $SW_1$, ..., $SW_{n-1}$ in a one-to-one correspondence manner, the data output terminals of the n switch circuits $SW_0$, $SW_1$, ..., $SW_{n-1}$ are connected to the n data input terminals $D_0$, $D_1$, ..., $D_{n-1}$ of the scan chain circuit module in a one-to-one correspondence manner, the n data output terminals $Q_0$, $Q_1$, ..., $Q_{n-1}$ of the scan chain circuit module are connected to the second data input terminals $IN_0$, $IN_1$, ..., $IN_{n-1}$ of the combinational logic circuit module in a one-to-one correspondence manner, the deviation data output terminal OUT of the scan chain circuit module is connected to the data input terminal of the data processing module, and the response output terminal of the data processing module is used for outputting PUF response data;

The n first data output terminals of the external stimulus source are used for outputting n n-bit path stimulus signals $SIG\_IN_0$, $SIG\_IN_1$, ..., $SIG\_IN_{n-1}$, the $k^{th}$ n-bit path stimulus signal $SIG\_IN_k$ is used for activating the $k^{th}$ combinational logic path in the combinational logic circuit module, and k=1, 2, ..., n; the n stimulus output terminals of the external stimulus source are used for outputting n n-bit combinational logic circuit input control signal $CTL\_G_0$, $CTL\_G_1$, ... $CTL\_G_{n-1}$; the n selective control output terminals of the external stimulus source are used for outputting selective control signals $CTL\_IN_0$, $CTL\_IN_1$, ..., $CTL\_IN_{n-1}$; the n switch circuits $SW_0$, $SW_1$, ..., $SW_{n-1}$ turn on their first data input terminals or second data input terminals according to selective control signals input to their control input terminals; data output by the data output terminal of the $j^{th}$ switch circuit $SW_j$ is input to the $j^{th}$ data input terminal $D_j$ of the scan chain circuit module, and is used for controlling the $j^{th}$ data output terminal $Q_j$ of the scan chain circuit module to produce a signal jump, so as to generate and output a scan flip-flop stimulus signal $SIG\_D_j$; the clock output terminal of the external stimulus source is used for outputting five clock signals to the clock input terminal CLK of the scan chain circuit module, and the five clock signals are an initialization clock signal CLK_SU comprising n clock cycles with a length T, a reference clock signal CLK_NC comprising 2n clock cycles with the length T, an over-clock signal CLK_OC comprising 2n clock cycles with a length ranging from 70% T to T, an output clock signal CLK_OUT comprising n(n+1)/2 clock cycles with the length T, and a deviation output clock signal CLK_OUT' comprising n(n+1)/2 clock cycles with the length T, wherein $T=T_{path}$; the first control terminal of the external stimulus source is used for outputting a first control signal, which is used for controlling initialization of the n data output terminals $Q_0$, $Q_1$, ..., $Q_{n-1}$ of the scan chain circuit module; the second control terminal of the external stimulus source is used for outputting a second control signal, which is a high level signal or a lower level signal and is used for controlling the n data output terminals $Q_0$, $Q_1$, ..., $Q_{n-1}$ of the scan chain circuit module to output a high level signal or a low level signal; when the second control signal is a high level signal, the n data output terminals $Q_0$, $Q_1$, ..., $Q_{n-1}$ of the scan chain circuit module output a high level signal; when the second control signal is a low level signal, the n data output terminals $Q_0$, $Q_1$, ..., $Q_{n-1}$ of the scan chain circuit module output a low level signal;

The combinational logic circuit module comprises n switch circuits $S_0$, $S_1$, ..., $S_{n-1}$ and a combinational logic circuit, wherein the n switch circuits $S_0$, $S_1$, ..., $S_{n-1}$ each have a first data input terminal, a second data input terminal, a control input terminal and a data output terminal, the combinational logic circuit has n combinational logic paths with the maximum path delay $T_{path}$, each combinational logic path has an input terminal and an output terminal, the input terminals of the n combinational logic paths are correspondingly n input terminals $INC_0$, $INC_1$, ..., $INC_{n-1}$ of the combinational logic circuit, the output terminals of the n combinational logic paths are correspondingly n output terminals $OUTC_0$, $OUTC_1$, ..., $OUTC_{n-1}$ of the combinational logic circuit, the input terminal of the $j^{th}$ combinational logic path is the $j^{th}$ input terminal $INC_j$ of the combinational logic circuit, the output terminal of the $j^{th}$ combinational logic path is the $j^{th}$ output terminal $OUTC_j$ of the combinational logic circuit, the n output terminals $OUTC_0$, $OUTC_1$, ..., $OUTC_{n-1}$ of the combinational logic circuit are taken as the n data output terminals $OUT_0$, $OUT_1$, ..., $OUT_{n-1}$ of the combinational logic circuit module, the data output terminals the n switch circuits $S_0$, $S_1$, ..., $S_{n-1}$ are connected to the n input terminals $INC_0$, $INC_1$, ..., $INC_{n-1}$ of the combinational logic circuit in a one-to-one correspondence manner, the first data input terminals of n switch circuits $S_0$, $S_1$, ..., $S_{n-1}$ are taken as the n second data input terminals $IN_0$, $IN_1$, ..., $IN_{n-1}$ of the combinational logic circuit module, the second data input terminals of the n switch circuits $S_0$, $S_1$, ..., $S_{n-1}$ are taken as the n first data input terminals $IN\_G_0$, $IN\_G_1$, ..., $IN\_G_{n-1}$ of the combinational logic circuit module, and the control input terminals of the n switch circuits $S_0$, $S_1$, ..., $S_{n-1}$ are taken as the n control input terminals $CTL_0$, $CTL_1$, ..., $CTL_{n-1}$ of the combinational logic circuit module;

The scan chain circuit module comprises n scan flip-flops (SFFs) $SFF_0$, $SFF_1$, ..., $SFF_{n-1}$, wherein each scan flip-flop has a data input terminal D, a scan data input terminal SI, a test control input terminal SE, a clock input terminal CK and a data output terminal Q; the data input terminals D of the n scan flip-flops are taken as the n data input terminals $D_0$, $D_1$, ..., $D_{n-1}$ of the scan chain circuit module; the data output terminal Q of the $f^{th}$ scan flip-flop is connected to the scan data input terminal SI of the $(f+1)^{th}$ scan flip-flop, a connecting terminal is taken as the $f^{th}$ data output terminal $Q_{f-1}$ of the scan chain circuit module, and f=1, 2, ..., n-1; the data output terminal Q of the $n^{th}$ scan flip-flop is taken as the $n^{th}$ data output terminal $Q_{n-1}$ and the deviation data output terminal OUT of the scan chain circuit module; the clock input terminals CK of the n scan flip-flops are connected, and a connecting terminal is the clock input terminal CLK of the scan chain circuit module; the test control input terminals SE of the n scan flip-flops are connected, and a connecting terminal is taken as the test control input terminal SE_IN of the scan chain circuit module; the scan data input terminal SI of the first scan flip-flop is the scan data input terminal of the scan chain circuit module; each of the n switch circuits $SW_0$, $SW_1$, . . . , $SW_{n-1}$ and the n switch circuits $S_0$, $S_1$, . . . , $S_{n-1}$ is implemented by a 2-to-1 multiplexer, which has a first data input terminal A, a second data input terminal B, a control input terminal and a data output terminal, wherein the first data input terminal A of the 2-to-1 multiplexer is taken as the first data input terminal of the switch circuit, the second data input terminal B of the 2-to-1 multiplexer is taken as the second data input terminal of the switch circuit, the control input terminal of the 2-to-1 multiplexer is taken as the control input terminal of the switch circuit, and the data output terminal of the 2-to-1 multiplexer is taken as the data output terminal of the switch circuit;

The specific process of generating PUF responses of the SPUF based on combinational logic and scan chain in this embodiment comprises the following steps:

Step 1: generating reference data, which specifically comprises:

S1-1: acquiring a first sample result signal: first, outputting, by the second control terminal of the external stimulus source, a high level signal to the test control input terminal SE_IN of the scan chain circuit module, outputting, by the clock output terminal of the external stimulus source, the initialization clock signal CLK_SU comprising the n clock cycles with the length T to the clock input terminal CLK of the scan chain circuit module, and inputting in series, by the first control terminal of the external stimulus source, a first control signal for initializing the n data output terminals $Q_0$, $Q_1$, . . . , $Q_{n-1}$ of the scan chain circuit module to the scan data input terminal SI_IN of the scan chain circuit module within each cycle of the initialization clock signal CLK_SU, such that the n data output terminals $Q_0$, $Q_1$, . . . , $Q_{n-1}$ of the scan chain circuit module are initialized after the n cycles of the initialization clock signal CLK_SU; then, outputting, by the second control terminal of the external stimulus source, a low level signal to the test control input terminal SE_IN of the scan chain circuit module, outputting, by the clock signal output terminal of the external stimulus source, the reference clock signal CLK_NC comprising the 2n clock cycles with the length T to the clock input terminal CLK of the scan chain circuit module, outputting, by the n selective control output terminals of the external stimulus source, a selective control signal CTL_$IN_0$ to the control input terminals of the switch circuits $SW_0$, $SW_1$, $SW_2$, . . . , $SW_{n-1}$ to enable the switch circuit $SW_0$ to turn on its first data input terminal and enable the other (n−1) switch circuits $SW_1$, $SW_2$, . . . , $SW_{n-1}$ to turn on their second data input terminals, inputting, by the $1^{st}$ second data output terminal of the external stimulus source, a first scan flip-flop stimulus signal SIG_$D_0$ to the first data input terminal of the switch circuit $SW_0$, and producing, by the data output terminal Q of the first scan flip-flop $SFF_0$, a signal jump within the first clock cycle of the reference clock signal CLK_NC to output a first combinational circuit stimulus signal $J_0$; next, inputting, by the n first data output terminals of the external stimulus source, a first n-bit path stimulus signal SIG_$IN_0$ to the n first data input terminals IN_$G_0$, IN_$G_1$, . . . , IN_$G_{n-1}$ of the combinational logic circuit module, inputting, by the n stimulus output terminals of the external stimulus source, a first n-bit combinational logic circuit input control signal CTL_$G_0$ to the n control input terminals $CTL_0$, $CTL_1$, . . . , $CTL_{n-1}$ of the combinatorial logic circuit module to enable the switch circuit $S_0$ to turn on its first data input terminal and enable the other (n−1) switch circuits $S_1$, $S_2$, . . . , $S_{n-1}$ to turn on their second data input terminals, transmitting, by the $1^{st}$ second data input terminal $IN_0$ of the combinational logic circuit module, the first combinational circuit stimulus signal $J_0$ to the first input terminal $INC_0$ of the combinational logic circuit, correspondingly transmitting other bits than the first one of the first n-bit path stimulus signal SIG_$IN_0$ to the input terminals $INC_1$, $INC_2$, . . . , $INC_{n-1}$ of the combination logic circuit to activate the first combinational logic path of the combinational logic circuit, producing, by the first combinational logic path, a signal jump at the output terminal $OUTC_0$ of the combinational logic circuit, at this moment, outputting, by the output terminal $OUTC_0$ of the combinational logic circuit module, a first sampled signal $P_0$, and outputting, by the data output terminal Q of the second scan flip-flop $SFF_1$, a first sample result signal $R_0$ within the second clock cycle of the reference clock signal CLK_NC; and finally, outputting, by the second control terminal of the external stimulus source, a high level signal to the test control input terminal SE_IN of the scan chain circuit module, outputting, by the clock output terminal of the external stimulus source, the output clock signal CLK_OUT comprising the n(n+1)/2 clock cycles with the length T to the clock input terminal CLK of the scan chain circuit module, and after the first (n−1) clock cycles, outputting, by the deviation data output terminal OUT of the scan chain circuit module, the first sample result signal $R_0$ to the data processing module;

S1-2: acquiring a second sample result signal: first, outputting, by the second control terminal of the external stimulus source, a low level signal to the test control input terminal SE_IN of the scan chain circuit module, inputting, by the clock output terminal of the external stimulus source, the reference clock signal CLK_NC comprising the 2n clock cycles with the length T to the clock input terminal CLK of the scan chain circuit module, and inputting, by the n selective control output terminals of the external stimulus source, a second n-bit external stimulus source input control signal CTL_$IN_1$ to the n control input terminals of the switch circuits $SW_0$, $SW_1$, . . . , $SW_{n-1}$ to enable the switch circuit $SW_1$ to turn on its first data input terminal and the other (n−1) switch circuits $SW_0$, $SW_2$, $SW_3$, . . . , $SW_{n-1}$ to turn on their second data input terminals, inputting, by the $2^{nd}$ second data output terminal of the external stimulus source, a second scan flip-flop stimulus signal SIG_$D_1$ to the second data input terminal of the switch circuit $SW_1$, and producing, by the data output terminal Q of the second scan flip-flop $SFF_1$, a signal jump within the third clock cycle of the reference clock signal CLK_NC to output a second combinational circuit stimulus signal $J_1$; then, inputting, by the external stimulus source, a second n-bit path stimulus signal SIG_$IN_1$ to the n control input terminals $CTL_0$, CTL, . . . , $CTL_{n-1}$ of the combinational logic circuit module, inputting a second n-bit combinational logic circuit input control signal CTL_$G_1$ to the n control input terminals CTL$_0$, CTL$_1$, . . . , CTL$_{n-1}$ of the combinatorial logic circuit module to enable the switch circuit $S_1$ to turn on its first data input terminal and enable the other (n−1) switch circuits $S_0$, $S_2$, $S_3$, . . . , $S_{n-1}$ to turn on their second data input terminals, transmitting, by the second data input terminal IN$_1$ of the combinational logic circuit module, the second combinational circuit stimulus signal $J_1$ to the input terminal INC$_1$ of the combinational logic circuit, correspondingly transmitting other bits than the first one of the second n-bit path stimulus signal SIG_IN$_1$ to INC$_0$, INC$_2$, INC$_3$, . . . , INC$_{n-1}$ of the combination logic circuit to activate the second combinational logic path, producing, by the second combinational logic path, a signal jump at the second output terminal OUTC$_1$ of the combinational logic circuit, outputting, by the second data output terminal OUT$_1$ of the combinational logic circuit module, a second sampled signal $P_1$, and outputting, by the data output terminal Q of the third scan flip-flop SFF$_2$, a second sample result signal $R_1$ within the fourth clock cycle of the reference clock signal CLK_NC; and finally, outputting, by the second control terminal of the external stimulus source, a high level signal to the test control input terminal SE_IN of the scan chain circuit module, inputting, by the clock output terminal of the external stimulus source, the output clock signal CLK_OUT comprising the n(n+1)/2 clock cycles with the length T to the clock input terminal CLK of the scan chain circuit module, and after (n−2) clock cycles from the n$^{th}$ cycle of the clock signal CLK_OUT, outputting, by the deviation data output terminal OUT of the scan chain circuit module, the second sample result signal $R_1$ to the data processing module;

S1-3: acquiring a third sample result signal; first, outputting, by the second control terminal of the external stimulus source, a low level signal to the test control input terminal SE_IN of the scan chain circuit module, inputting, by the clock output terminal of the external stimulus source, the reference clock signal CLK_NC comprising the 2n clock cycles with the length T to the clock input terminal CLK of the scan chain circuit module, and inputting, by the n selective control output terminals of the external stimulus source, a third n-bit external stimulus source input control signal CTL_IN$_2$ to the n control input terminals of the switch circuits SW$_0$, SW$_1$, . . . , SW$_{n-1}$ to enable the switch circuit SW$_2$ to turn on its first data input terminal and enable the other (n−1) switch circuits SW$_0$, SW$_1$, SW$_3$, SW$_4$, . . . , SW$_{n-1}$ to turn on their second data input terminals, inputting, by the external stimulus source, a third scan flip-flop stimulus signal SIG_D$_2$ to the first data input terminal of the switch circuit SW$_2$, and producing, by the data output terminal Q of the third scan flip-flop SFF$_2$, a signal jump within the fifth clock cycle of the reference clock signal CLK_NC to output a third combinational circuit stimulus signal $J_2$; then, inputting, by the external stimulus source, a third n-bit path stimulus signal SIG_IN$_2$ to the n first data input terminals IN_G$_0$, IN_G$_1$, . . . , IN_G$_{n-1}$ of the combinational logic circuit module, inputting a third n-bit combinational logic circuit input control signal CTL_G$_2$ to the n control input terminals CTL$_0$, CTL$_1$, . . . , CTL$_{n-1}$ of the combinatorial logic circuit module to enable the switch circuit $S_2$ to turn on its first data input terminal and enable the other (n−1) switch circuits $S_0$, $S_1$, $S_3$, $S_4$, . . . , $S_{n-1}$ to turn on their second data input terminals, transmitting, by the second data input terminal IN$_2$ of the combinational logic circuit module, the third combinational circuit stimulus signal $J_2$ to the input terminal INC$_2$ of the combinational logic circuit, correspondingly transmitting other bits than the first one of the third n-bit path stimulus signal SIG_IN$_2$ to other output terminals INC$_0$, INC$_1$, INC$_3$, INC$_4$, . . . , INC$_{n-1}$ of the combination logic circuit to activate the third combinational logic path, producing, by the third combinational logic path, a signal jump at the output terminal OUTC$_2$ of the combinational logic circuit, outputting, by the data output terminal OUT$_2$ of the combinational logic circuit module, a third sampled signal $P_2$, and outputting, by the data output terminal Q of the fourth scan flip-flop SFF$_3$, a third sample result signal $R_2$ within the sixth clock cycle of the reference clock signal CLK_NC; and finally, outputting, by the second control terminal of the external stimulus source, a high level signal to the test control input terminal SE_IN of the scan chain circuit module, outputting, by the clock output terminal of the external stimulus source, the output clock signal CLK_OUT comprising the n(n+1)/2 clock cycles with the length T to the clock input terminal CLK of the scan chain circuit module, and after (n−3) clock cycles from the (2n−1)$^{th}$ cycle of the output clock signal CLK_OUT, outputting, by the deviation data output terminal OUT of the scan chain circuit module, the third sample result signal $R_2$ to the data processing module;

S1-4: sequentially acquiring a fourth sample result signal to an n$^{th}$ sample result signal $R_3$, $R_4$, . . . , $R_{n-1}$ in the same way as S1-1 to $S_1$-3, and outputting the fourth sample result signal the an n$^{th}$ sample result signal $R_3$, $R_4$, . . . , $R_{n-1}$ to the data processing module;

Step 2: generating deviation data, which specifically comprises:

S2-1: acquiring a first deviation sample result signal: first, outputting, by the second control terminal of the external stimulus source, a high level signal to the test control input terminal SE_IN of the scan chain circuit module, inputting, by the clock output terminal of the external stimulus source, the initialization clock signal CLK_SU comprising the n clock cycles with the length T to the clock input terminal CLK of the scan chain circuit module, outputting, by the first control terminal of the external stimulus source, a first control signal to the scan data input terminal SI_IN of the scan chain circuit module to initialize the n data output terminals of the scan chain circuit module within each cycle of the initialization clock signal CLK_SU, such that after n cycles, the n data output terminals of the scan chain circuit module are initialized; then, outputting, by the second control terminal of the external stimulus source, a low level signal to the test control input terminal SE_IN of the scan chain circuit module, inputting, by the clock output terminal of the external stimulus source, the over-clock signal CLK_OC comprising the 2n clock cycles with the length ranging from 70% T to T to the clock input terminal CLK of the scan chain circuit module, inputting, by the selective control output terminals of the external stimulus source, a first n-bit external stimulus source input control signal CTL_IN$_0$ to the control input terminals of the switch circuits SW$_0$, SW$_1$, . . . , SW$_{n-1}$ to enable the switch circuit SW$_0$ to turn on its first data input terminal and enable the other (n–1) switch circuits $SW_1$, $SW_2$, . . . , $SW_{n-1}$ to turn on their second data input terminals, inputting, by the $1^{st}$ second data output terminal of the external stimulus source, a first scan flip-flop stimulus signal $SIG\_D_0$ to the first data input terminal of the switch circuit $SW_0$, producing, by the data output terminal Q of the first scan flip-flop $SFF_0$, a signal jump within the first clock cycle of the over-clock signal CLK_OC, and outputting, by the first data output terminal of the scan chain circuit module, a first deviation stimulus signal $J_0'$; then, inputting, by the n first data output terminals of the external stimulus source, a first n-bit path stimulus signal $SIG\_IN_0$ to the n data input terminals $IN\_G_0$, $IN\_G_1$, . . . , $IN\_G_{n-1}$ of the combinational logic circuit module, inputting, by the n stimulus output terminals of the external stimulus source, a first n-bit combinational logic circuit input control signal $CTL\_G_0$ to the n control input terminals $CTL_0$, $CTL_1$, . . . , $CTL_{n-1}$ of the combinational logic circuit module to enable the switch circuit $S_0$ to turn on its first data input terminal and enable the other (n–1) switch circuits $S_1$, $S_2$, . . . , $S_{n-1}$ to turn on their second data input terminals, transmitting, by the second data input terminal $IN_0$ of the combinational logic circuit module, the first deviation stimulus signal $J_0'$ to the input terminal $INC_0$ of the combinational logic circuit, correspondingly transmitting other bits than the first one of the first n-bit path stimulus signal $SIG\_IN_0$ to the output terminals $INC_1$, $INC_2$, . . . , $INC_{n-1}$ of the combinational logic circuit to activate the first combinational logic path, producing, by the first combinational logic path, a signal jump at the output terminal $OUTC_0$ of the combinational logic circuit, outputting, by the output terminal $OUT_0$ of the combinational logic circuit module, a first deviation sample signal $P_0'$, and outputting, by the data output terminal Q of the second scan flip-flop $SFF_1$, a first deviation sample result signal $R_0'$ within the second clock cycle of the over-clock signal CLK_OC; and finally, outputting, by the second control terminal of the external stimulus source, a high level signal to the test control input terminal SE_IN of the scan chain circuit module, inputting, by the clock output terminal of the external stimulus source, the deviation output clock signal CLK_OUT' comprising n(n+1)/2 clock cycles with the length T to the clock input terminal CLK of the scan chain circuit module, and after the first (n–1) clock cycles, outputting, by the deviation data output terminal OUT of the scan chain circuit module, the first deviation sample result signal $R_0'$ to the data processing module;

S2-2: acquiring a second deviation sample result signal: first, outputting, by the second control terminal of the external stimulus source, a low level signal to the test control input terminal SE_IN of the scan chain circuit module, inputting, by the clock output terminal of the external stimulus source, the over-clock signal CLK_OC comprising 2n clock cycles with the length ranging from 70% T to T to the clock input terminal CLK of the scan chain circuit module, inputting, by the selective control output terminals of the external stimulus source, a second n-bit external stimulus source input control signal $CTL\_IN_1$ to the control input terminals of the switch circuits $SW_0$, $SW_1$, . . . , $SW_{n-1}$ to enable the switch circuit $SW_1$ to turn on its first data input terminal and enable the other (n–1) switch circuits $SW_0$, $SW_2$, $SW_3$, . . . , $SW_{n-1}$ to turn on their second data input terminals, inputting, by the $2^{nd}$ second data output terminal of the external stimulus source, a second scan flip-flop stimulus signal $SIG\_D_1$ to the first data input terminal of the switch circuit $SW_1$, producing, by the data output terminal Q of the second scan flip-flop $SFF_1$, a signal jump within the third clock cycle of the over-clock signal CLK_OC, and outputting, by the second data output terminal of the scan chain circuit module, a second deviation stimulus signal $J_1'$; next, inputting, by the n first data output terminals of the external stimulus source, a second n-bit path stimulus signal $SIG\_IN_1$ to the n first data input terminals $IN\_G_0$, $IN\_G_1$, . . . , $IN\_G_{n-1}$ of the combinational logic circuit module, inputting, by the n stimulus output terminals of the external stimulus source, a second n-bit combinational logic circuit input control signal $CTL\_G_1$ to the n control input terminals $CTL_0$, $CTL_1$, . . . , $CTL_{n-1}$ of the combinational logic circuit module to enable the switch circuit $S_1$ to turn on its first data input terminal and enable the other (n–1) switch circuits $S_0$, $S_2$, $S_3$, . . . , $S_{n-1}$ to turn on their second data input terminals, transmitting, by the second data input terminal $IN_1$ of the combinational logic circuit module, the second deviation stimulus signal $J_1'$ to the input terminal $INC_1$ of the combinational logic circuit, correspondingly transmitting other bits than the first one of the second n-bit path stimulus signal $SIG\_IN_1$ to the output terminals $INC_0$, $INC_2$, $INC_3$, . . . , $INC_{n-1}$ of the combinational logic circuit to activate the second combinational logic path, producing, by the second combinational logic path, a signal jump at the output terminal $OUTC_1$ of the combinational logic circuit, and outputting, by the second output terminal $OUT_1$ of the combinational logic circuit module, a second deviation sample signal $P_1'$, and outputting, by the data output terminal Q of the third scan flip-flop $SFF_2$, a second deviation sample result signal $R_1'$ within the fourth clock cycle of the over-clock signal CLK_OC; and finally, outputting, by the second control terminal of the external stimulus source, a high level signal to the test control input terminal SE_IN of the scan chain circuit module, inputting, by the clock output terminal of the external stimulus source, the deviation output clock signal CLK_OUT' comprising n(n+1)/2 clock cycles with the length T to the clock input terminal CLK of the scan chain circuit module, and after (n–2) clock cycles from the $n^{th}$ cycle of the deviation output clock signal CLK_OUT', outputting, by the deviation data output terminal OUT of the scan chain circuit module, the second deviation sample result signal $R_1'$ to the data processing module;

S2-3: acquiring a third deviation sample result signal: first, outputting, by the second control terminal of the external stimulus source, a low level signal to the test control input terminal SE_IN of the scan chain circuit module, inputting, by the clock output terminal of the external stimulus source, the over-clock signal CLK_OC comprising 2n clock cycles with the length ranging from 70% T to T to the clock input terminal CLK of the scan chain circuit module, inputting, by the n selective control output terminals of the external stimulus source, a third n-bit external stimulus source input control signal $CTL\_IN_2$ to the control input terminals of the switch circuits $SW_0$, $SW_1$, . . . , $SW_{n-1}$ to enable the switch circuit $SW_2$ to turn on its first data input terminal and enable the other (n–1) switch circuits $SW_0$, $SW_1$, $SW_3$, $SW_4$, . . . , $SW_{n-1}$ to turn on their second data input terminals, inputting, by the $3^{rd}$ second data output terminal of the external stimulus source, a third scan flip-flop stimulus signal SIG_D$_2$ to the first data input terminal of the switch circuit SW$_2$, producing, by the data output terminal Q of the third scan flip-flop SFF$_2$, a signal jump within the fifth clock cycle of the over-clock signal CLK_OC, and outputting, by the third data output terminal of the scan chain circuit module, a third deviation stimulus signal J$_2$'; next, inputting, by the n first data output terminals of the external stimulus source, a third n-bit path stimulus signal SIG_IN$_2$ to the n first data input terminals IN_G$_0$, IN_G$_1$, . . . , IN_G$_{n-1}$ of the combinational logic circuit module, inputting, by the n stimulus output terminals of the external stimulus source, a third n-bit combinational logic circuit input control signal CTL_G$_2$ to the n control input terminals CTL$_0$, CTL$_1$, . . . , CTL$_{n-1}$ of the combinational logic circuit module to enable the switch circuit S$_2$ to turn on its first data input terminal and enable the other (n−1) switch circuits S$_0$, S$_1$, S$_3$, S$_4$, . . . , S$_{n-1}$ to turn on their second data input terminals, transmitting, by the second data input terminal IN$_2$ of the combinational logic circuit module, the third deviation stimulus signal J$_2$' to the input terminal INC$_2$ of the combinational logic circuit, correspondingly transmitting other bits than the first one of the third n-bit path stimulus signal SIG_IN$_2$ to the output terminals INC$_0$, INC$_2$, INC$_3$, . . . , INC$_{n-1}$ of the combinational logic circuit to activate the third combinational logic path, producing, by the third combinational logic path, a signal jump at the output terminal OUTC$_2$ of the combinational logic circuit, and outputting, by the third output terminal OUT$_2$ of the combinational logic circuit module, a third deviation sample signal P$_2$', and outputting, by the data output terminal Q of the fourth scan flip-flop SFF$_3$, a third deviation sample result signal R$_2$' within the sixth clock cycle of the over-clock signal CLK_OC; and finally, outputting, by the second control terminal of the external stimulus source, a high level signal to the test control input terminal SE_IN of the scan chain circuit module, inputting, by the clock output terminal of the external stimulus source, the output clock signal CLK_OUT comprising n(n+1)/2 clock cycles with the length T to the clock input terminal CLK of the scan chain circuit module, and after (n−3) clock cycles from the (2n−1)$^{th}$ cycle of the output clock signal CLK_OUT, outputting, by the deviation data output terminal OUT of the scan chain circuit module, the third deviation sample result signal R$_2$' to the data processing module;

S2-4: sequentially acquiring the fourth deviation sample result signal to the n$^{th}$ deviation sample result signal R$_3$', R$_4$', . . . , R$_{n-1}$' in the same way as S2-1 to S2-3, and outputting the fourth deviation sample result signal to the n$^{th}$ deviation sample result signal R$_3$', R$_4$', . . . , R$_{n-1}$' to the data processing module; and Step 3: data processing: performing, by the data processing module, a bitwise XOR operation on logic values L$_0$, L$_1$, . . . , L$_{n-1}$ of the sample result signals R$_0$, R$_1$, . . . , R$_{n-1}$ and logic values L$_0$', L$_1$', . . . , L$_{n-1}$' of the deviation sample result signals R$_0$', R$_1$', . . . , R$_{n-1}$' to obtain an n-bit binary sequence SEQ, then calculating the number CNT of logic 1 in SEQ, converting CNT into a log$_2$ n-bit binary number which a PUF response, and outputting the PUF response by the response output terminal of the data processing module.

The uniqueness of chip features is evaluated by Hamming Distance (HD), that is, by the percentage of the number of different bits between any two PUF responses of the total number of bits, which is 50% under an ideal condition. The uniqueness of k PUFs is calculated by:

$$\text{Uniqueness} = \frac{2}{k(k-1)} \sum_{i=1}^{k-1} \sum_{j=i+1}^{k} \frac{HD(R_i, R_j)}{n} \times 100\% \tag{1}$$

Figure 4:
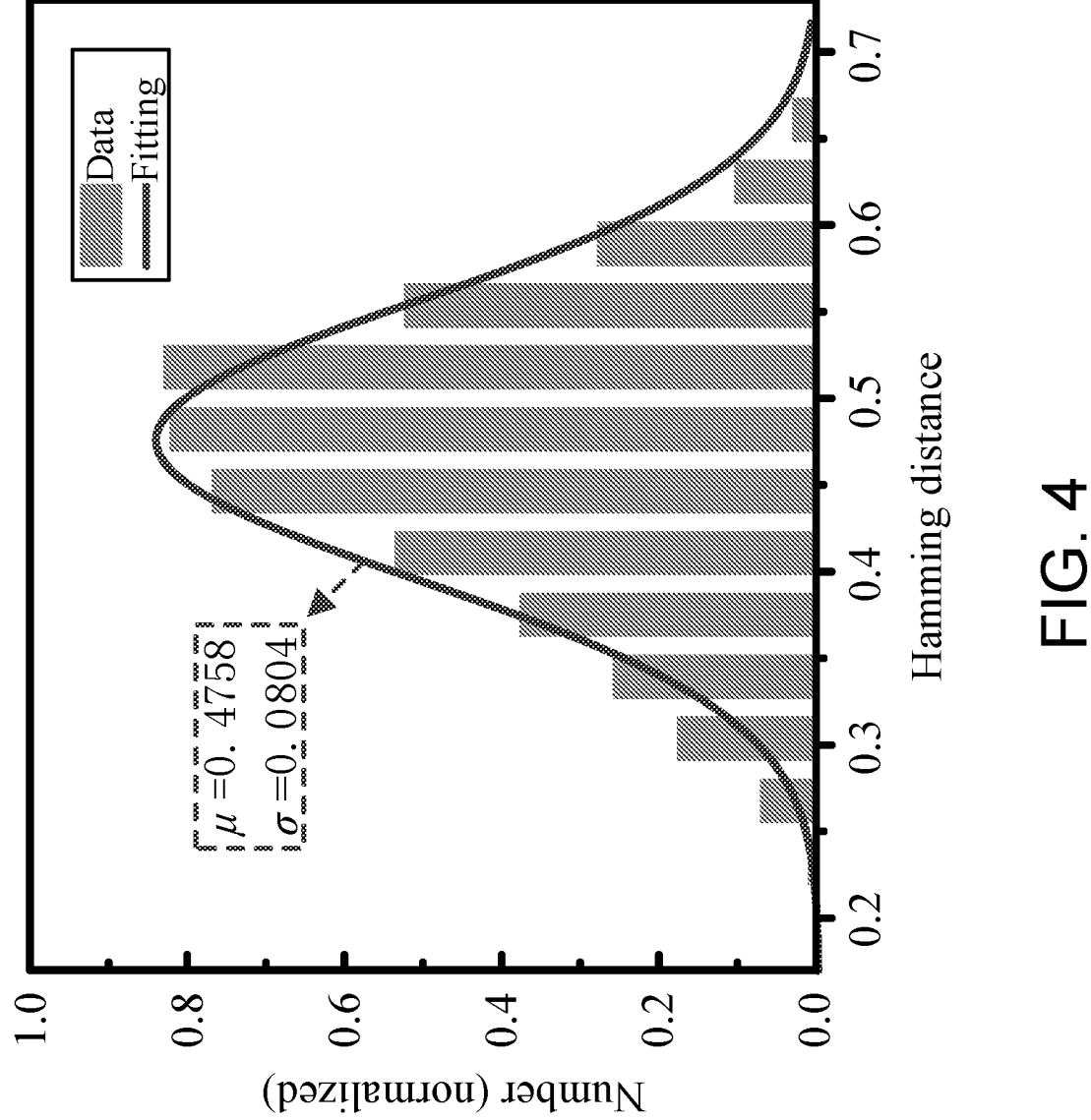
FIG. 4 is a simulation chart of the Hamming distance distribution of the SPUF based on combinational logic and scan chain according to the invention.

Where, R$_i$ and R$_j$ respectively represent the output response of the i$^{th}$ PUF and the output response of the j$^{th}$ PUF under the same stimulus, n represents the number of bits of the response, and HD(R$_i$, R$_j$) is the Hamming distance between the output responses. As can be seen from FIG. 4 which illustrates the Hamming distance distribution of output responses obtained by 50 Monte Carlo simulations, the Hamming distance follows the normal distribution meeting the mathematical expectation μ=0.4758 and the standard deviation σ=0.0804. It can be obtained, by calculation according to formula (1), that the uniqueness of the invention is 47.58%, indicating that the PUF can provide a high-uniqueness signature to identify each chip.

The randomness is calculated by the probability of logic 1 output by the PUF, and under an ideal condition, the probability of logic 1 and the probability of logic 1 are both 50%. Upon statistics, the probability of logic 1 in output responses is 49.68%. The information entropy[22] is an indicator for evaluating the randomness of a bit stream, and may be calculated by formula (2).

$$\text{Entropy} = -\sum_{r=0}^{1} p(r)\log_2 p(r) \tag{2}$$

Figure 5:
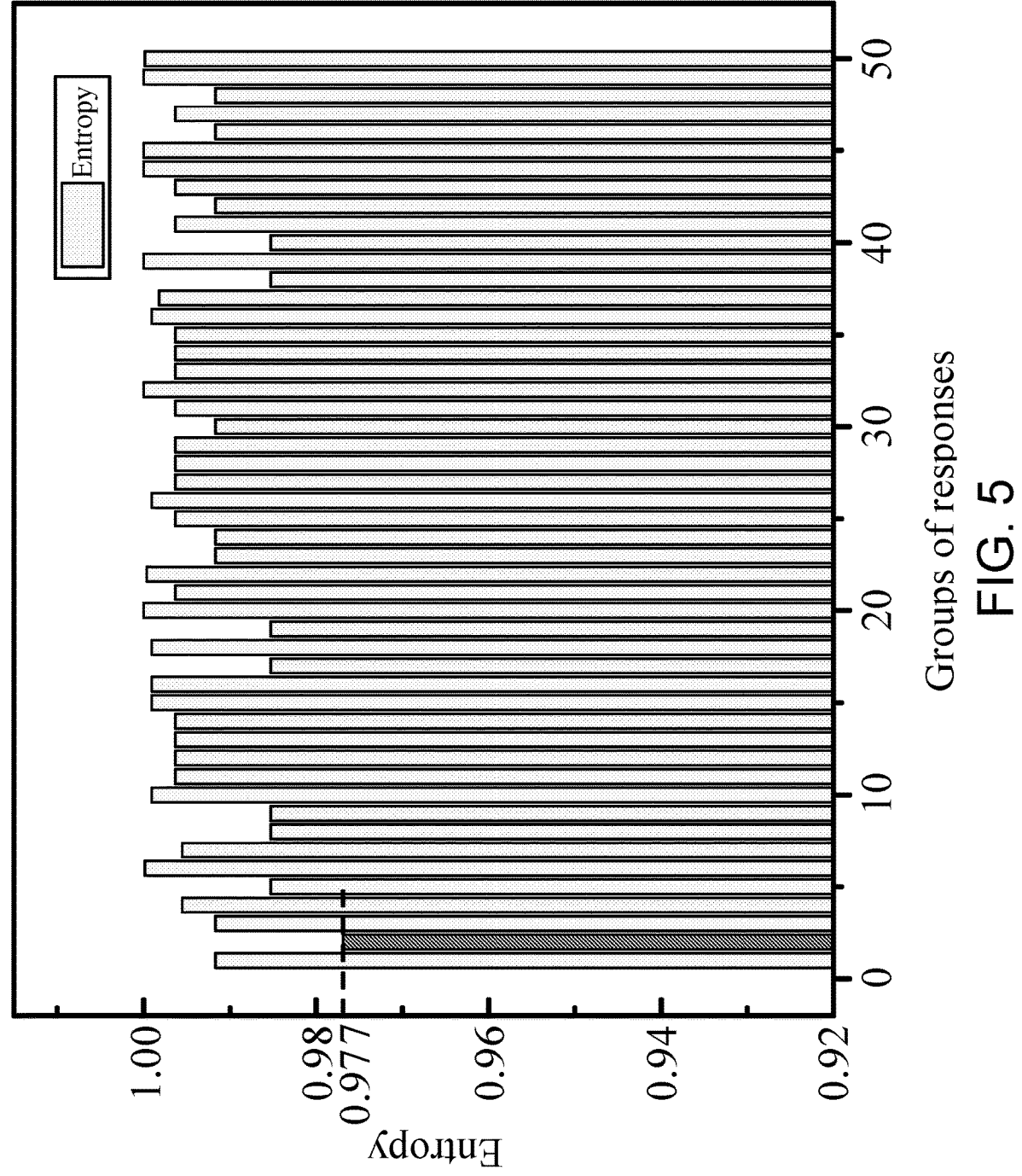
FIG. 5 is a simulation chart of the entropy distribution of the SPUF based on combinational logic and scan chain according to the invention.

Where, p(r) is the probability of logic 0 or 1 in responses, and the entropy distribution of PUF responses calculated by formula (2) is shown by FIG. 5. It can be known from FIG. 5 that the minimum information entropy of each group of responses is 0.977, indicating that the output responses of the SPUF based on combinational logic and scan chain have high randomness.

ML attack is one of the most effective attacks on strong PUFs. The attacker first collects a certain number of PUF response stimulus pairs, then trains a prediction model using the obtained stimulus response set, and finally, obtain complete PUF stimulus response pairs by means of the prediction model. It can be known, from *Literature Zheng Y, Zhang F, Bhunia S. DScanPUF: A delay-based physical unclonable function built into scan chain. IEEE Transactions on Very Large Scale Integration (VLSI) Systems, 2016, 24(3): 1059-1070*, that a direct and simple method against ML attacks is to enlarge the stimulus response space of the PUF. However, when this method is applied to APUF or RO PUF, the area expenditure and fabrication cost will be increased. The SPUF provided by the invention obtains a large number of stimulus response pairs by sensitizing more paths, which are inherent resources of circuits, so the fabrication cost is not increased. Moreover, the SPUF provided by the invention comprises a delay type random entropy source and a memory type random entropy source, which makes ML modeling more difficult, thus having the capacity to resist ML attacks. The performance comparison of the SPUF provided by the invention and other different types of PUFs is shown in Table 1.

TABLE 1

Performance comparison of different types of PUFs

| Literature | Type | Process | Unique-ness | Random-ness | Circuit generating extra deviation |
|---|---|---|---|---|---|
| [1] | Delay type | Xilinx Artix 7 | 49.1% | 50.3% | Exist |
| [2] | Time sequence violation type | Altera Cyclone III | 49.9% | NIST test | Exist |
| [3] | Memory type | Synopsys EDK32/28 nm | 47.5% | 59.9% | Exist |
| [4] | Time sequence violation type | Xilinx Spartan 3E | 40.6% | — | None |
| [5] | Time sequence violation type | Altera Cyclone IV | 24.35% | — | Exist |
| The invention | Time sequence violation type | TSMC 65 nm CMOS | 47.58% | 49.7% | None |

In Table 1, Literature 1 is He Z, Chen W, Zhang L, et al. *A highly reliable arbiter PUF with improved uniqueness in FPGA implementation using bit-self-test. IEEE Access,* 2020, 8: 1817S1-181762; Literature 2 is Zheng Y, Zhang F, Bhunia S. DScanPUF: *A delay-based physical unclonable function built into scan chain. IEEE Transactions on Very Large Scale Integration (VLSI) Systems,* 2016, 24(3): 1059-1070; Literature 3 is Wang S J, Lien C H, Li K S M. *Register PUF with no power-up restrictions Proceedings of the* 2018 *IEEE International Symposium on Circuits and Systems (ISCAS). Florence, Italy,* 2018: 1-5; Literature 4 is Maiti A, Schaumont P. *A novel microprocessor-intrinsic physical unclonable function Proceedings of the International Conference on Field Programmable Logic & Applications (FPL). Oslo, Norway,* 2012: 380-387; Literature 5 is Aysu A, Schaumont P. *Hardware Software co-design of physical unclonable function based authentications on FPGAs. Microprocessors and Microsystems,* 2015, 39(7): 589-597. It can be known from Table 1 that the SPUF based on combinational logic and scan chain has high uniqueness and randomness and does not need an extra deviation generation circuit.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An SPUF based on combinational logic and scan chain, comprising: an external stimulus source, a combinational logic circuit module, a scan chain circuit module, a data processing module and n switch circuits $SW_0$, $SW_1$, . . . , $SW_{n-1}$, $n=2^m$, and m is an integer greater than or equal to 1; the external stimulus source has n first data output terminals, n stimulus output terminals, n second data output terminals, n selective control output terminals, a first control terminal, a second control terminal and a clock output terminal; the combinational logic circuit module has n first data input terminals, n second data input terminals, n control input terminals, n data output terminals, and n combinational logic paths, and a maximum path delay of the n combinational logic paths is denoted as $T_{path}$; the scan chain circuit module has a scan data input terminal, a test control input terminal, a clock input terminal, n data input terminals, n data output terminals, and a deviation data output terminal; the n switch circuits $SW_0$, $SW_1$, . . . , $SW_{n-1}$ each have a first data input terminal, a second data input terminal, a control input terminal and a data output terminal; the data processing module has a data input terminal and a response output terminal; the n first data output terminals of the external stimulus source are connected to the n first data input terminals of the combinational logic circuit module in a one-to-one correspondence manner, the n stimulus output terminals of the external stimulus source are connected to the n control input terminals of the combinational logic circuit module in a one-to-one correspondence manner, the first control terminal of the external stimulus source is connected to the scan data input terminal of the scan chain circuit module, the second control terminal of the external stimulus source is connected to the test control input terminal of the scan chain circuit module, the clock output terminal of the external stimulus source is connected to the clock input terminal of the scan chain circuit module, the n second data output terminals of the external stimulus source are connected to the first data input terminals of the n switch circuits $SW_0$, $SW_1$, . . . , $SW_{n-1}$ in a one-to-one correspondence manner, the n selective control output terminals of the external stimulus source are connected to the control input terminals of the n switch circuits $SW_0$, $SW_1$, . . . , $SW_{n-1}$ in a one-to-one correspondence manner, the $n^{th}$ data output terminal of the combinational logic circuit module is connected to the second data input terminal of the switch circuit $SW_0$, the first to the $(n-1)^{th}$ data output terminals of the combinational logic circuit module are connected to the second data input terminals of the switch circuits $SW_1$, . . . , $SW_{n-1}$ in a one-to-one correspondence manner, the data output terminals of the n switch circuits $SW_0$, $SW_1$, . . . , $SW_{n-1}$ are connected to the n data input terminals of the scan chain circuit module in a one-to-one correspondence manner, the n data output terminals of the scan chain circuit module are connected to the n second data input terminals of the combinational logic circuit module in a one-to-one correspondence manner, the deviation data output terminal of the scan chain circuit module is connected to the data input terminal of the data processing module, and the response output terminal of the data processing module is configured to output PUF response data;

the n first data output terminals of the external stimulus source are used for outputting n path stimulus signals which each has n-bit, the $k^{th}$ n-bit path stimulus signal is used for activating the $k^{th}$ combinational logic path in the combinational logic circuit module, and $k=0, 1, 2, . . . , n-1$; the n stimulus output terminals of the external stimulus source are used for outputting n combinational logic circuit input control signal which each has n-bit; the n selective control output terminals of the external stimulus source are used for outputting selective control signals; the n switch circuits $SW_0$, $SW_1$, . . . , $SW_{n-1}$ turn on first data input terminals or second data input terminals of the n switch circuits $SW_0$, $SW_1$, . . . , $SW_{n-1}$ according to selective control signals input to control input terminals of the n switch circuits $SW_0$, $SW_1$, . . . , $SW_{n-1}$; data output by the data output terminal of the $j^{th}$ switch circuit $SW_j$ is input to the $j^{th}$ data input terminal of the scan chain circuit module, and is configured to control the $j^{th}$ data output terminal of the scan chain circuit module to produce a signal transition, so as to generate and output a scan flip-flop stimulus signal, wherein j=0, 1, 2, . . . , n−1; the clock output terminal of the external stimulus source is configured to output five clock signals to the clock input terminal of the scan chain circuit module, and the five clock signals are an initialization clock signal comprising n clock cycles with a time period, a reference clock signal comprising 2n clock cycles with the time period, an over-clock signal comprising 2n clock cycles with a time period ranging from 70% to 100% of the time period, an output clock signal comprising n(n+1)/2 clock cycles with the time period, and a deviation output clock signal comprising n(n+1)/2 clock cycles with the time period, wherein the time period=$T_{path}$; the first control terminal of the external stimulus source is configured to output a first control signal, which is configured to control initialization of the n data output terminals of the scan chain circuit module; the second control terminal of the external stimulus source is configured to output a second control signal, which is a high level signal or a low level signal and is configured to control the n data output terminals of the scan chain circuit module to output a high level signal or a low level signal; when the second control signal is a high level signal, the n data output terminals of the scan chain circuit module output a high level signal; when the second control signal is a low level signal, the n data output terminals of the scan chain circuit module output a low level signal;

the combinational logic circuit module comprises n switch circuits S0, S1, . . . , Sn−1 and a combinational logic circuit, wherein the n switch circuits $S_0$, $S_1$, . . . , $S_{n-1}$ each have a first data input terminal, a second data input terminal, a control input terminal and a data output terminal, the combinational logic circuit has the n combinational logic paths with the maximum path delay $T_{path}$, each combinational logic path has an input terminal and an output terminal, the input terminals of the n combinational logic paths are correspondingly n input terminals of the combinational logic circuit, the output terminals of the n combinational logic paths are correspondingly n output terminals of the combinational logic circuit, the input terminal of the $j^{th}$ combinational logic path is the $j^{th}$ input terminal of the combinational logic circuit, the output terminal of the $j^{th}$ combinational logic path is the $j^{th}$ output terminal of the combinational logic circuit, the n output terminals of the combinational logic circuit are taken as the n data output terminals of the combinational logic circuit module, the data output terminals the n switch circuits $S_0$, $S_1$, . . . , $S_{n-1}$ are connected to the n input terminals of the combinational logic circuit in a one-to-one correspondence manner, the first data input terminals of the n switch circuits $S_0$, $S_1$, . . . , $S_{n-1}$ are taken as the n second data input terminals of the combinational logic circuit module, the second data input terminals of the n switch circuits $S_0$, $S_1$, . . . , $S_{n-1}$ are taken as the n first data input terminals of the combinational logic circuit module, and the control input terminals of the n switch circuits $S_0$, $S_1$, . . . , $S_{n-1}$ are taken as the n control input terminals of the combinational logic circuit module;

the scan chain circuit module comprises n scan flip-flops (SFFs), wherein each scan flip-flop has a data input terminal, a scan data input terminal, a test control input terminal, a clock input terminal and a data output terminal; the data input terminals of the n scan flip-flops are taken as the n data input terminals of the scan chain circuit module; the data output terminal of the $f^{th}$ scan flip-flop is connected to the scan data input terminal of the $(f+1)^{th}$ scan flip-flop, a connecting terminal is taken as the $f^{th}$ data output terminal of the scan chain circuit module, and f=1, 2, . . . , n−1; the data output terminal of the $n^{th}$ scan flip-flop is taken as the $n^{th}$ data output terminal and the deviation data output terminal of the scan chain circuit module; the clock input terminals of the n scan flip-flops are connected, and a connecting terminal is the clock input terminal of the scan chain circuit module; the test control input terminals of the n scan flip-flops are connected, and a connecting terminal is taken as the test control input terminal of the scan chain circuit module; the scan data input terminal of a first scan flip-flop is the scan data input terminal of the scan chain circuit module; each of the n switch circuits $SW_0$, $SW_1$, . . . , $SW_{n-1}$ and the n switch circuits $S_0$, $S_1$, . . . , $S_{n-1}$ is implemented by a 2-to-1 multiplexer, which has a first data input terminal, a second data input terminal, a control input terminal and a data output terminal, wherein the first data input terminal of the 2-to-1 multiplexer is taken as the first data input terminal of each of the switch circuits $SW_0$, $SW_1$, . . . , $SW_{n-1}$ and $S_0$, $S_1$, . . . , $S_{n-1}$, the second data input terminal of the 2-to-1 multiplexer is taken as the second data input terminal of each of the switch circuits $SW_0$, $SW_1$, . . . , $SW_{n-1}$ and $S_0$, $S_1$, . . . , $S_{n-1}$, the control input terminal of the 2-to-1 multiplexer is taken as the control input terminal of each of the switch circuits $SW_0$, $SW_1$, . . . , $SW_{n-1}$ and $S_0$, $S_1$, . . . , $S_{n-1}$, and the data output terminal of the 2-to-1 multiplexer is taken as the data output terminal of each of the switch circuits $SW_0$, $SW_1$, . . . , $SW_{n-1}$ and $S_0$, $S_1$, . . . , $S_{n-1}$;

the SPUF based on the combinational logic and the scan chain is configured to generate PUF responses by following steps:

step 1: generating reference data, which specifically comprises:

step 1-1: acquiring a first sample result signal: first, outputting, by the second control terminal of the external stimulus source, a high level signal to the test control input terminal of the scan chain circuit module, outputting, by the clock output terminal of the external stimulus source, the initialization clock signal comprising the n clock cycles with the time period to the clock input terminal of the scan chain circuit module, and inputting in series, by the first control terminal of the external stimulus source, a first control signal for initializing the n data output terminals of the scan chain circuit module to the scan data input terminal of the scan chain circuit module within each cycle of the initialization clock signal, such that the n data output terminals of the scan chain circuit module are initialized after the n clock cycles of the initialization clock signal; then, outputting, by the second control terminal of the external stimulus source, a low level signal to the test control input terminal of the scan chain circuit module, outputting, by the clock output terminal of the external stimulus source, the reference clock signal comprising the 2n clock cycles with the time period to the clock input terminal of the scan chain circuit module, outputting, by the n selective control output terminals of the external stimulus source, a selective control signal to the control input terminals of the switch circuits $SW_0$, $SW_1$, $SW_2$, . . . , $SW_{n-1}$ to enable the switch circuit $SW_0$ to turn on the first data input terminal of the switch circuit $SW_0$ and enable the other (n–1) switch circuits $SW_1, SW_2, \ldots, SW_{n-1}$ to turn on second data input terminals of the other (n–1) switch circuits $SW_1, SW_2, \ldots, SW_{n-1}$, inputting, by the $1^{st}$ second data output terminal of the external stimulus source, a first scan flip-flop stimulus signal to the first data input terminal of the switch circuit $SW_0$, and producing, by the data output terminal of the first scan flip-flop, a signal transition within a first clock cycle of the reference clock signal to output a first combinational circuit stimulus signal; next, inputting, by the n first data output terminals of the external stimulus source, a first n-bit path stimulus signal to the n first data input terminals of the combinational logic circuit module, inputting, by the n stimulus output terminals of the external stimulus source, a first n-bit combinational logic circuit input control signal to the n control input terminals of the combinational logic circuit module to enable the switch circuit $S_0$ to turn on the first data input terminal of the switch circuit $S_0$ and enable the other (n–1) switch circuits $S_1, S_2, \ldots, S_{n-1}$ to turn on the second data input terminals of the other (n–1) switch circuits $S_1, S_2, \ldots, S_{n-1}$, transmitting, by the $1^{st}$ second data input terminal of the combinational logic circuit module, the first combinational circuit stimulus signal to a first input terminal of the combinational logic circuit, correspondingly transmitting other bits than the $1^{st}$ bit of the first n-bit path stimulus signal to the input terminals of the combinational logic circuit to activate a first combinational logic path of the combinational logic circuit, producing, by the first combinational logic path, a signal transition at the output terminal of the combinational logic circuit, at this moment, outputting, by the output terminal of the combinational logic circuit module, a first sampled signal, and outputting, by the data output terminal of a second scan flip-flop, a first sample result signal within a second clock cycle of the reference clock signal; and finally, outputting, by the second control terminal of the external stimulus source, a high level signal to the test control input terminal of the scan chain circuit module, outputting, by the clock output terminal of the external stimulus source, the output clock signal comprising the n(n+1)/2 clock cycles with the time period to the clock input terminal of the scan chain circuit module, and after first (n–1) clock cycles, outputting, by the deviation data output terminal of the scan chain circuit module, the first sample result signal to the data processing module;

step 1-2: acquiring a second sample result signal: first, outputting, by the second control terminal of the external stimulus source, a low level signal to the test control input terminal of the scan chain circuit module, inputting, by the clock output terminal of the external stimulus source, the reference clock signal comprising the 2n clock cycles with the time period to the clock input terminal of the scan chain circuit module, and inputting, by the n selective control output terminals of the external stimulus source, a second n-bit external stimulus source input control signal to the n control input terminals of the switch circuits $SW_0, SW_1, \ldots, SW_{n-1}$ to enable the switch circuit $SW_1$ to turn on first data input terminal of the switch circuit $SW_1$ and the other (n–1) switch circuits $SW_0, SW_2, SW_3, \ldots, SW_{n-1}$ to turn on the second data input terminals of the other (n–1) switch circuits $SW_0, SW_2, SW_3, \ldots, SW_{n-1}$, inputting, by the $2^{nd}$ second data output terminal of the external stimulus source, a second scan flip-flop stimulus signal to the second data input terminal of the switch circuit $SW_1$, and producing, by the data output terminal of the second scan flip-flop, a signal transition within a third clock cycle of the reference clock signal to output a second combinational circuit stimulus signal $J_1$; then, inputting, by the external stimulus source, a second n-bit path stimulus signal to the n control input terminals of the combinational logic circuit module, inputting a second n-bit combinational logic circuit input control signal to the n control input terminals of the combinational logic circuit module to enable the switch circuit $S_1$ to turn on the first data input terminal of the switch circuit $S_1$ and enable the other (n–1) switch circuits $S_0, S_2, S_3, \ldots, S_{n-1}$ to turn on the second data input terminals of the other (n–1) switch circuits $S_0, S_2, S_3, \ldots, S_{n-1}$, transmitting, by the second data input terminal of the combinational logic circuit module, the second combinational circuit stimulus signal to the input terminal of the combinational logic circuit, correspondingly transmitting other bits than the $1^{st}$ bit of the second n-bit path stimulus signal of the combinational logic circuit to activate a second combinational logic path, producing, by the second combinational logic path, a signal transition at a second output terminal of the combinational logic circuit, outputting, by the $2^{nd}$ data output terminal of the combinational logic circuit module, a second sampled signal, and outputting, by the data output terminal of a third scan flip-flop, a second sample result signal within a fourth clock cycle of the reference clock signal; and finally, outputting, by the second control terminal of the external stimulus source, a high level signal to the test control input terminal of the scan chain circuit module, inputting, by the clock output terminal of the external stimulus source, the output clock signal comprising the n(n+1)/2 clock cycles with the time period to the clock input terminal of the scan chain circuit module, and after (n–2) clock cycles from a $n^{th}$ cycle of the output clock signal, outputting, by the deviation data output terminal of the scan chain circuit module, the second sample result signal to the data processing module;

step 1-3: acquiring a third sample result signal; first, outputting, by the second control terminal of the external stimulus source, a low level signal to the test control input terminal of the scan chain circuit module, inputting, by the clock output terminal of the external stimulus source, the reference clock signal comprising the 2n clock cycles with the time period to the clock input terminal of the scan chain circuit module, and inputting, by the n selective control output terminals of the external stimulus source, a third n-bit external stimulus source input control signal to the n control input terminals of the switch circuits $SW_0, SW_1, \ldots, SW_{n-1}$ to enable the switch circuit $SW_2$ to turn on the first data input terminal of the switch circuit $SW_2$ and enable the other (n–1) switch circuits $SW_0, SW_1, SW_3, SW_4, \ldots, SW_{n-1}$ to turn on the second data input terminals of the other (n–1) switch circuits $SW_0, SW_1, SW_3, SW_4, \ldots, SW_{n-1}$, inputting, by the external stimulus source, a third scan flip-flop stimulus signal to the first data input terminal of the switch circuit $SW_2$, and producing, by the data output terminal of the third scan flip-flop, a signal transition within a fifth clock cycle of the reference clock signal to output a third combinational circuit stimulus signal; then, inputting, by the external stimulus source, a third n-bit path stimulus signal to the n first data input terminals of the combinational logic circuit module, inputting a third n-bit combinational logic circuit input control signal to the n control input terminals of the combinational logic circuit module to enable the switch circuit $S_2$ to turn on first data input terminal of the switch circuit $S_2$ and enable the other (n–1) switch circuits $S_0$, $S_1$, $S_3$, $S_4$, . . . , $S_{n-1}$ to turn on the second data input terminals, transmitting of the other (n–1) switch circuits $S_0$, $S_1$, $S_3$, $S_4$, . . . , $S_{n-1}$, by the second data input terminal of the combinational logic circuit module, the third combinational circuit stimulus signal to the input terminal of the combinational logic circuit, correspondingly transmitting other bits than the $1^{st}$ bit of the third n-bit path stimulus signal to other output terminals of the combinational logic circuit to activate a third combinational logic path, producing, by the third combinational logic path, a signal transition at the output terminal of the combinational logic circuit, outputting, by the data output terminal of the combinational logic circuit module, a third sampled signal, and outputting, by the data output terminal of a fourth scan flip-flop, a third sample result signal within a sixth clock cycle of the reference clock signal; and finally, outputting, by the second control terminal of the external stimulus source, a high level signal to the test control input terminal of the scan chain circuit module, outputting, by the clock output terminal of the external stimulus source, the output clock signal comprising the n(n+1)/2 clock cycles with the time period to the clock input terminal of the scan chain circuit module, and after (n–3) clock cycles from $(2n-1)^{th}$ clock cycle of the output clock signal, outputting, by the deviation data output terminal of the scan chain circuit module, the third sample result signal to the data processing module;

step 1-4: sequentially acquiring a fourth sample result signal to an $n^{th}$ sample result signal in the same way as the steps 1-1 to 1-3, and outputting the fourth sample result signal to an $n^{th}$ sample result signal to the data processing module;

step 2: generating deviation data, which specifically comprises:

step 2-1: acquiring a first deviation sample result signal: first, outputting, by the second control terminal of the external stimulus source, a high level signal to the test control input terminal of the scan chain circuit module, inputting, by the clock output terminal of the external stimulus source, the initialization clock signal comprising the n clock cycles with the time period to the clock input terminal of the scan chain circuit module, outputting, by the first control terminal of the external stimulus source, a first control signal to the scan data input terminal of the scan chain circuit module to initialize the n data output terminals of the scan chain circuit module within each cycle of the initialization clock signal, such that after n cycles, the n data output terminals of the scan chain circuit module are initialized; then, outputting, by the second control terminal of the external stimulus source, a low level signal to the test control input terminal of the scan chain circuit module, inputting, by the clock output terminal of the external stimulus source, the over-clock signal comprising the 2n clock cycles with the time period ranging from 70% to 100% of the time period to the clock input terminal of the scan chain circuit module, inputting, by the n selective control output terminals of the external stimulus source, a first n-bit external stimulus source input control signal to the control input terminals of the switch circuits $SW_0$, $SW_1$, . . . , $SW_{n-1}$ to enable the switch circuit $SW_0$ to turn on the first data input terminal of the switch circuit $SW_0$ and enable the other (n–1) switch circuits $SW_1$, $SW_2$, . . . , $SW_{n-1}$ to turn on the second data input terminals of the other (n–1) switch circuits $SW_1$, $SW_2$, . . . , $SW_{n-1}$, inputting, by the $1^{st}$ second data output terminal of the external stimulus source, a first scan flip-flop stimulus signal to the first data input terminal of the switch circuit $SW_0$, producing, by the data output terminal of the first scan flip-flop, a signal transition within a first clock cycle of the over-clock signal, and outputting, by the $1^{st}$ data output terminal of the scan chain circuit module, a first deviation stimulus signal; then, inputting, by the n first data output terminals of the external stimulus source, the first n-bit path stimulus signal to the n data input terminals of the combinational logic circuit module, inputting, by the n stimulus output terminals of the external stimulus source, a first n-bit combinational logic circuit input control signal to the n control input terminals of the combinational logic circuit module to enable the switch circuit $S_0$ to turn on the first data input terminal of the switch circuit $S_0$ and enable the other (n–1) switch circuits $S_1$, $S_2$, . . . , $S_{n-1}$ to turn on the second data input terminals of the other (n–1) switch circuits $S_1$, $S_2$, . . . , $S_{n-1}$, transmitting, by the second data input terminal of the combinational logic circuit module, the first deviation stimulus signal to the input terminal of the combinational logic circuit, correspondingly transmitting other bits than the $1^{st}$ bit of the first n-bit path stimulus signal to the output terminals of the combinational logic circuit to activate the first combinational logic path, producing, by the first combinational logic path, a signal transition at the output terminal of the combinational logic circuit, outputting, by the output terminal of the combinational logic circuit module, a first deviation sample signal, and outputting, by the data output terminal of the second scan flip-flop, a first deviation sample result signal within a second clock cycle of the over-clock signal; and finally, outputting, by the second control terminal of the external stimulus source, a high level signal to the test control input terminal of the scan chain circuit module, inputting, by the clock output terminal of the external stimulus source, the deviation output clock signal comprising the n(n+1)/2 clock cycles with the time period to the clock input terminal of the scan chain circuit module, and after first (n–1) clock cycles, outputting, by the deviation data output terminal of the scan chain circuit module, the first deviation sample result signal to the data processing module;

step 2-2: acquiring a second deviation sample result signal: first, outputting, by the second control terminal of the external stimulus source, a low level signal to the test control input terminal of the scan chain circuit module, inputting, by the clock output terminal of the external stimulus source, the over-clock signal comprising 2n clock cycles with the time period ranging from 70% to 100% of the time period to the clock input terminal of the scan chain circuit module, inputting, by the n selective control output terminals of the external stimulus source, a second n-bit external stimulus source input control signal to the control input terminals of the switch circuits $SW_0$, $SW_1$, . . . , $SW_{n-1}$ to enable the switch circuit $SW_1$ to turn on the first data input terminal of the switch circuit $SW_1$ and enable the other $(n-1)$ switch circuits $SW_0$, $SW_2$, $SW_3$, . . . , $SW_{n-1}$ to turn on the second data input terminals of the other $(n-1)$ switch circuits $SW_0$, $SW_2$, $SW_3$, . . . , $SW_{n-1}$, inputting, by the $2^{nd}$ second data output terminal of the external stimulus source, a second scan flip-flop stimulus signal to the first data input terminal of the switch circuit $SW_1$, producing, by the data output terminal of the second scan flip-flop, a signal transition within a third clock cycle of the over-clock signal, and outputting, by the $2^{nd}$ data output terminal of the scan chain circuit module, a second deviation stimulus signal; next, inputting, by the n first data output terminals of the external stimulus source, the second n-bit path stimulus signal to the n first data input terminals of the combinational logic circuit module, inputting, by the n stimulus output terminals of the external stimulus source, a second n-bit combinational logic circuit input control signal to the n control input terminals of the combinational logic circuit module to enable the switch circuit $S_1$ to turn on the first data input terminal of the switch circuit $S_1$ and enable the other $(n-1)$ switch circuits $S_0$, $S_2$, $S_3$, . . . , $S_{n-1}$ to turn on the second data input terminals of the other $(n-1)$ switch circuits $S_0$, $S_2$, $S_3$, . . . , $S_{n-1}$, transmitting, by the second data input terminal of the combinational logic circuit module, the second deviation stimulus signal to the input terminal of the combinational logic circuit, correspondingly transmitting other bits than the $1^{st}$ bit of the second n-bit path stimulus signal to the output terminals of the combinational logic circuit to activate the second combinational logic path, producing, by the second combinational logic path, a signal transition at the output terminal of the combinational logic circuit, and outputting, by the $2^{nd}$ output terminal of the combinational logic circuit module, a second deviation sample signal, and outputting, by the data output terminal of the third scan flip-flop, a second deviation sample result signal within a fourth clock cycle of the over-clock signal; and finally, outputting, by the second control terminal of the external stimulus source, a high level signal to the test control input terminal of the scan chain circuit module, inputting, by the clock output terminal of the external stimulus source, the deviation output clock signal comprising the $n(n+1)/2$ clock cycles with the time period to the clock input terminal of the scan chain circuit module, and after $(n-2)$ clock cycles from $n^{th}$ cycle of the deviation output clock signal, outputting, by the deviation data output terminal of the scan chain circuit module, the second deviation sample result signal to the data processing module;

step 2-3: acquiring a third deviation sample result signal: first, outputting, by the second control terminal of the external stimulus source, a low level signal to the test control input terminal of the scan chain circuit module, inputting, by the clock output terminal of the external stimulus source, the over-clock signal comprising 2n clock cycles with the time period ranging from 70% to 100% of the time period to the clock input terminal of the scan chain circuit module, inputting, by the n selective control output terminals of the external stimulus source, a third n-bit external stimulus source input control signal to the control input terminals of the switch circuits $SW_0$, $SW_1$, . . . , $SW_{n-1}$ to enable the switch circuit $SW_2$ to turn on the first data input terminal of the switch circuit $SW_2$ and enable the other $(n-1)$ switch circuits $SW_0$, $SW_1$, $SW_3$, $SW_4$, . . . , $SW_{n-1}$ to turn on the second data input terminals of the other $(n-1)$ switch circuits $SW_0$, $SW_1$, $SW_3$, $SW_4$, . . . , $SW_{n-1}$, inputting, by the $3^{rd}$ second data output terminal of the external stimulus source, a third scan flip-flop stimulus signal to the first data input terminal of the switch circuit $SW_2$, producing, by the data output terminal of the third scan flip-flop, a signal transition within a fifth clock cycle of the over-clock signal, and outputting, by the $3^{rd}$ data output terminal of the scan chain circuit module, a third deviation stimulus signal; next, inputting, by the n first data output terminals of the external stimulus source, the third n-bit path stimulus signal to the n first data input terminals of the combinational logic circuit module, inputting, by the n stimulus output terminals of the external stimulus source, a third n-bit combinational logic circuit input control signal to the n control input terminals of the combinational logic circuit module to enable the switch circuit $S_2$ to turn on the first data input terminal of the switch circuit $S_2$ and enable the other $(n-1)$ switch circuits $S_0$, $S_1$, $S_3$, $S_4$, . . . , $S_{n-1}$ to turn on the second data input terminals of the other $(n-1)$ switch circuits $S_0$, $S_1$, $S_3$, $S_4$, . . . , $S_{n-1}$, transmitting, by the second data input terminal of the combinational logic circuit module, the third deviation stimulus signal to the input terminal of the combinational logic circuit, correspondingly transmitting other bits than the $1^{st}$ bit of the third n-bit path stimulus signal to the output terminals of the combinational logic circuit to activate the third combinational logic path, producing, by the third combinational logic path, a signal transition at the output terminal of the combinational logic circuit, and outputting, by the $3^{rd}$ output terminal of the combinational logic circuit module, a third deviation sample signal, and outputting, by the data output terminal of the fourth scan flip-flop, a third deviation sample result signal within a sixth clock cycle of the over-clock signal; and finally, outputting, by the second control terminal of the external stimulus source, a high level signal to the test control input terminal of the scan chain circuit module, inputting, by the clock output terminal of the external stimulus source, the output clock signal comprising the $n(n+1)/2$ clock cycles with the time period to the clock input terminal of the scan chain circuit module, and after $(n-3)$ clock cycles from $(2n-1)^{th}$ cycle of the output clock signal, outputting, by the deviation data output terminal of the scan chain circuit module, the third deviation sample result signal to the data processing module;

step 2-4: sequentially acquiring a fourth deviation sample result signal to a $n^{th}$ deviation sample result signal in the same way as the steps 2-1 to 2-3, and outputting the fourth deviation sample result signal to the $n^{th}$ deviation sample result signal to the data processing module; and Step 3: data processing: performing, by the data processing module, a bitwise XOR operation on logic values of the first to $n^{th}$ sample result signals and logic values of the first to $n^{th}$ deviation sample result signals to obtain an n-bit binary sequence, then calculating a number of logic 1 in the n-bit binary sequence, converting the number into a $log_2$ n-bit binary number which a PUF response, and outputting the PUF response by the response output terminal of the data processing module.

\* \* \* \* \*